US011966843B2

(12) United States Patent
Arunachalam et al.

(10) Patent No.: US 11,966,843 B2
(45) Date of Patent: Apr. 23, 2024

(54) METHODS AND APPARATUS FOR DISTRIBUTED TRAINING OF A NEURAL NETWORK

(71) Applicant: Intel Corporation, Santa Clara, CA (US)

(72) Inventors: Meenakshi Arunachalam, Portland, OR (US); Arun Tejusve Raghunath Rajan, Santa Clara, CA (US); Deepthi Karkada, Charlotte, NC (US); Adam Procter, Hillsboro, OR (US); Vikram Saletore, Hillsboro, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/839,010

(22) Filed: Jun. 13, 2022

(65) Prior Publication Data

US 2022/0309349 A1 Sep. 29, 2022

Related U.S. Application Data

(63) Continuation of application No. 15/829,555, filed on Dec. 1, 2017, now abandoned.

(51) Int. Cl.
*G06N 3/08* (2023.01)
*G06F 1/3203* (2019.01)
(Continued)

(52) U.S. Cl.
CPC ............. *G06N 3/08* (2013.01); *G06F 1/3203* (2013.01); *G06F 1/3206* (2013.01);
(Continued)

(58) Field of Classification Search
CPC ....................................................... G06N 3/08
See application file for complete search history.

(56) References Cited

U.S. PATENT DOCUMENTS 5,559,929 A     9/1996 Wasserman
6,198,324 B1 *  3/2001 Schober ................. H03K 5/151
                                                  327/217
(Continued)

FOREIGN PATENT DOCUMENTS

DE    102014207683 A1    10/2015
WO    2017/151759 A1     9/2017
WO    2018/175098 A1     9/2018

OTHER PUBLICATIONS

M. Najem, P. Benoit, M. El Ahmad, G. Sassatelli and L. Torres, "A Design-Time Method for Building Cost-Effective Run-Time Power Monitoring," in IEEE Transactions on Computer-Aided Design of Integrated Circuits and Systems, vol. 36, No. 7, pp. 1153-1166, Jul. 2017, doi: 10.1109/TCAD.2016.2614347. (Year: 2017).*

(Continued)

*Primary Examiner* — James D. Rutten
(74) *Attorney, Agent, or Firm* — Hanley, Flight & Zimmerman, LLC

(57) ABSTRACT

Methods, apparatus, systems and articles of manufacture for distributed training of a neural network are disclosed. An example apparatus includes a neural network trainer to select a plurality of training data items from a training data set based on a toggle rate of each item in the training data set. A neural network parameter memory is to store neural network training parameters. A neural network processor is to generate training data results from distributed training over multiple nodes of the neural network using the selected training data items and the neural network training parameters. The neural network trainer is to synchronize the training data results and to update the neural network training parameters.

21 Claims, 13 Drawing Sheets

(51) Int. Cl.
| | | |
|---|---|---|
| *G06F 1/3206* | (2019.01) | |
| *G06F 18/214* | (2023.01) | |
| *G06N 3/063* | (2023.01) | |
| *G06V 10/774* | (2022.01) | |
| *G06V 10/82* | (2022.01) | |
| *G06V 10/94* | (2022.01) | |
| *G06N 3/048* | (2023.01) | |

(52) U.S. Cl.
CPC ........... *G06F 18/214* (2023.01); *G06N 3/063* (2013.01); *G06V 10/774* (2022.01); *G06V 10/82* (2022.01); *G06V 10/94* (2022.01); *G06N 3/048* (2023.01)

(56) References Cited

U.S. PATENT DOCUMENTS

| | | | |
|---|---|---|---|
| 6,990,446 | B1 | 1/2006 | Huang et al. |
| 9,489,373 | B2 | 11/2016 | Simard et al. |
| 10,152,676 | B1 | 12/2018 | Strom |
| 10,769,551 | B2 | 9/2020 | Fujitani et al. |
| 2006/0147107 | A1 | 7/2006 | Zhang et al. |
| 2007/0067657 | A1 | 3/2007 | Ranganathan et al. |
| 2007/0098255 | A1* | 5/2007 | Yokono ............... G06V 10/771 382/190 |
| 2007/0140540 | A1 | 6/2007 | McLaren et al. |
| 2008/0141208 | A1* | 6/2008 | Hirota .................... G06F 30/39 716/112 |
| 2008/0243403 | A1* | 10/2008 | Furukawa ............. G06F 30/367 702/60 |
| 2015/0006102 | A1* | 1/2015 | Sato ................... G01R 31/2834 702/120 |
| 2015/0095620 | A1* | 4/2015 | Ananthakrishnan ......................... G06F 9/30083 712/220 |
| 2017/0184643 | A1 | 6/2017 | Homma et al. |
| 2017/0308789 | A1* | 10/2017 | Langford ............... G06N 3/045 |
| 2018/0240037 | A1 | 8/2018 | Morimura et al. |
| 2018/0336467 | A1 | 11/2018 | Guttmann et al. |
| 2020/0218964 | A1* | 7/2020 | Nakahara ................. G06N 3/08 |

OTHER PUBLICATIONS

McMahan et al., "Federated Learning: Collaborative Machine Learning without Centralized Training Data" Apr. 6, 2017, Google, accessed online on May 18, 2023 at <ai.googleblog.com/2017/04/federated-learning-collaborative.html> (Year: 2017).*

Du, M., Pierce, M., Pivovarova, L., Yangarber, R. (2014). Supervised Classification Using Balanced Training. In: Besacier, L., Dediu, AH., Martín-Vide, C. (eds) Statistical Language and Speech Processing. SLSP 2014. Lecture Notes in Computer Science(), vol. 8791. Springer, Cham. (Year: 2014).*

United States Patent and Trademark Office, "Non-Final Office Action," issued in connection with U.S. Appl. No. 15/829,555, dated Feb. 5, 2021, 28 pages.

United States Patent and Trademark Office, "Final Office Action," issued in connection with U.S. Appl. No. 15/829,555, dated May 18, 2021, 16 pages.

United States Patent and Trademark Office, "Advisory Action," issued in connection with U.S. Appl. No. 15/829,555, dated Aug. 3, 2021, 2 pages.

United States Patent and Trademark Office, "Non-Final Office Action," issued in connection with U.S. Appl. No. 15/829,555, dated Oct. 15, 2021, 18 pages.

United States Patent and Trademark Office, "Final Office Action," issued in connection with U.S. Appl. No. 15/829,555, dated Mar. 30, 2022, 18 pages.

United States Patent and Trademark Office, "Advisory Action," issued in connection with U.S. Appl. No. 15/829,555, dated Jun. 8, 2022, 3 pages.

* cited by examiner

METHODS AND APPARATUS FOR DISTRIBUTED TRAINING OF A NEURAL NETWORK

RELATED APPLICATION

This patent arises from a continuation of U.S. patent application Ser. No. 15/829,555, which was filed on Dec. 1, 2017. U.S. patent application Ser. No. 15/829,555 is hereby incorporated herein by reference in its entirety. Priority to U.S. patent application Ser. No. 15/829,555 is hereby claimed.

FIELD OF THE DISCLOSURE

This disclosure relates generally to artificial intelligence computing, and, more particularly, to methods and apparatus for distributed training of a neural network.

BACKGROUND

Neural networks are useful tools that have demonstrated their value solving very complex problems regarding pattern recognition, natural language processing, automatic speech recognition, etc. Neural networks operate using artificial neurons arranged into layers that process data from an input layer to an output layer, applying weighting values to the data along the way. Such weighting values are determined during a training process.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
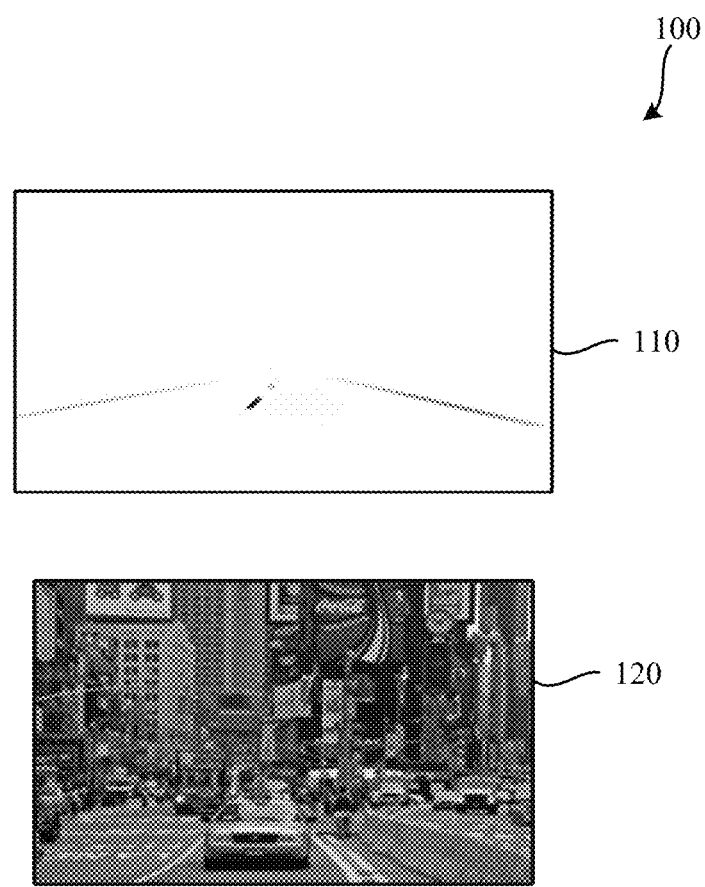
FIG. 1 is a representation of two images having different toggle rates.

Neural networks can be utilized for many different tasks including, for example, image recognition tasks, text classification tasks, etc. In some examples, image data is fed to a series of convolution and pooling (e.g., down-sampling) layers, which have the combined effect of extracting features from the image while at the same time reducing the spatial resolution. The output of the final convolution/pooling layer is then fed to a series of layers, which in the end produce a probability distribution across a set of classification labels. Such probability distribution labels can then be used to classify other images.

Neural networks as described above produce useful output if the neurons have been trained (e.g., assigned a suitable set of weights and biases that connect each layer). The process of arriving at accurate weights and/or biases (e.g., training parameters) is a computationally expensive process. In many cases, the parameter space is enormous. For example, the training process may involve finding a global minimum (or a close approximation thereof) of a function with millions of parameters. In some examples, a stochastic gradient descent (SGD) approach is used to determine the training parameters of a neural network. During training, the SGD approach uses small batches (mini-batches) of pre-labeled training data (typically somewhere between 32 and 1024 items) provided to the neural network, quantifying how accurately the neural network is able to classify the input via a differentiable loss or error function (E). This process is called forward propagation. The gradient of the loss function is then calculated with respect to the current training parameters. Using the gradients, training parameters are updated.

Each neural network layer is a differentiable function of the layer that precedes it. Thus, the gradients are computed layer-by-layer, moving from output to input, in a process called backward propagation. Finally, the weights in the network are adjusted according to the computed gradients, and the process is repeated with a fresh batch of training data until the network has reached a satisfactory degree of accuracy relative to the ground truth.

Training of a neural network is an expensive computational process. Such training often requires many iterations until a global minimum error is reached. In some examples, millions of iterations of the SGD process might be needed to arrive at the global minimum error. Processed serially, such iterations may take days, or even weeks, to complete. To address this, compute clusters are utilized to distribute the processing to multiple nodes to reduce the overall amount of processing time.

A natural extension of SGD, called synchronous SGD, allows training to be divided across multiple nodes. An iteration of synchronous SGD across N nodes is implemented by executing N forward/backward propagation passes in parallel, one on each node, with each node processing a mini-batch of training data. In examples disclosed herein, the mini-batches of training data are different among each respective node. In parallel with backward propagation (as backward propagation proceeds layer-by-layer), the nodes synchronize the gradients computed against their local mini-batches. In some examples, the gradients are synchronized in an "all-reduce" fashion. Each node takes the sum of these gradients, and applies it to its locally held copy of the weights and biases as usual; in this way, each node is assured to be working with the same weights and biases throughout the process. The synchronous SGD algorithm then continues with a new set of N mini-batches, repeating until convergence is reached.

An example disadvantage of the synchronous SGD algorithm is a susceptibility to a "straggler" problem. Due to the synchronous nature of the synchronous SGD approach, the system as a whole cannot work faster than its slowest node. In some examples, one SGD iteration may take between two hundred and five hundred milliseconds. Thus, if a first node were to complete the training iteration in two hundred milliseconds, and a second node were to complete the training iteration in five hundred milliseconds, the first node waits three hundred milliseconds for the second node to complete its training iteration, before synchronizing and proceeding to the next training iteration. This presents a significant challenge for scaling deep learning training across multiple nodes.

Not only does the imbalance of compute times increase the overall amount of time to train the neural network, the imbalance is a source of energy inefficiency. For example, the fastest nodes find themselves in a "hurry-up-and-wait" or "race-to-the-ground" power consumption situation.

A contributing factor to the differences encountered in processing times among the nodes is an imbalance in toggle rates in the training data. As used herein, a toggle rate is a metric representing an amount of variation in a training data item that results in variations in power consumption. In some examples, transistor switching activity increases with increased toggle rate, contributing to higher power consumption. FIG. 1 is a representation of two images having different toggle rates. A first image 110 is an image of a night scene along a road. A second image 120 is an image of a crowded city street. The first example image 110 has a low toggle rate, as the first image exhibits little variation from pixel to pixel. As a result, there is low transistor switching activity in connection with the first example image 110 and, consequently, lower power consumption. In contrast, a second image 120 has a high toggle rate, as a result of the many fine details and different pixel values from pixel to pixel. A higher toggle rate results in an increased amount of power being required from the node on which that data is processed.

Figure 2A:
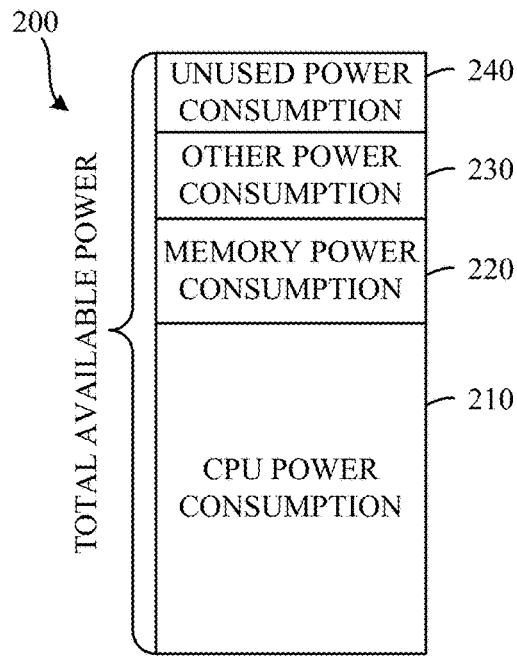
FIG. 2A is a diagram representing a distribution of power available at a compute node.

FIG. 2A is a diagram 200 representing a distribution of power available at a compute node. The example diagram 200 includes a first section 210 representative of an amount of central processing unit power consumption, a second section 220 representing an amount of memory power consumption, a third section 230 representing an amount of other power consumption, and a fourth section 240 representing an amount of unused power consumption. In the aggregate, the first section 210, the second section 220, the third section 230, and the fourth section 240 represent a total amount of power available at a compute node. While power allocated to a memory system, a central processing unit, and other components of the node may fluctuate over time, a total power utilized by the node cannot exceed the total amount of power available to the compute node. For example, the first section 210 representing CPU power consumption may be adjusted at the node such that the power consumed by the node does not exceed the total power available to the node. That is, power consumed by the CPU may be throttled (e.g., reduced) to accommodate situations where the amount of power required by the memory (e.g., section 220) and/or other components (e.g., section 230) would exceed the total amount of available power.

Figure 2B:
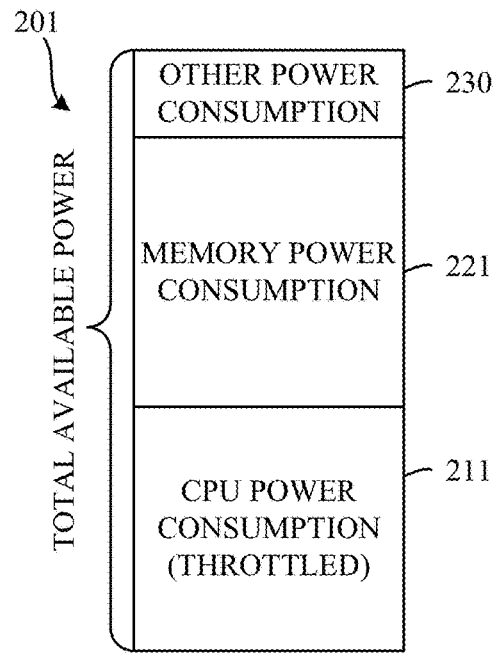
FIG. 2B is a diagram representing an alternate distribution of power available at a compute node when an increased toggle rate causes increased memory power consumption.

FIG. 2B is a diagram 201 representing an alternate distribution of power available at a compute node when an increased toggle rate causes increased memory power consumption. As described below in connection with the chain of causality of FIG. 3, in some examples, memory power consumption (section 220 of FIG. 2A) may become increased as a result of high data toggle rates (section 221 of FIG. 2B). In some examples, this may utilize all remaining power available to the node and, in some examples, may attempt to draw more power than is available to the node. To account for such overages, the CPU may be throttled. The example diagram 201 of FIG. 2B includes a first section 211 representing the throttled CPU power consumption, a second section 221 representing the increased memory power consumption, and a third section 231 representing an amount of other power consumption.

Figure 3:
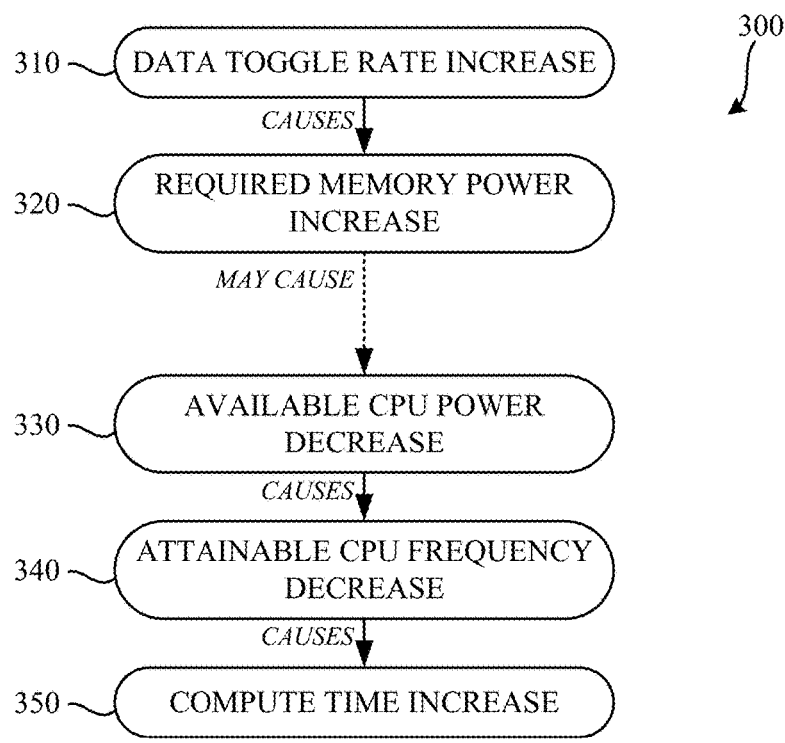
FIG. 3 is a diagram representing a chain of causality that leads to increased compute time at a compute node.

FIG. 3 is a diagram representing a chain of causality that leads to increased compute time at a compute node. In some examples, a toggle rate of training data may increase (Block 310). This increase in the toggle rate increases the amount of memory power consumption (Block 320). That is, the second section 220 of FIG. 2A becomes enlarged (see the second section 221 of FIG. 2B). In some examples, the increased amount of memory power consumption may cause the available CPU power to decrease (Block 330) (see the first section 211 of FIG. 2B). When the amount of CPU power is decreased, a processing frequency achieved by the CPU decreases (Block 340). When the processing frequency is reduced, and the amount of compute time to perform a training task increases (Block 350).

Such a chain of causality may result in a few practical effects. For example, nodes may take different amounts of compute time to process training data, and depending on the data toggle rate, some nodes may complete their iteration of the synchronous SGD earlier while others "straggle". Also, nodes that complete earlier (since they are processing training data with low data toggle rates) tend to run at a higher CPU frequency and consume more energy/power than nodes that process training data with higher toggle rates, which are forced move to lower power states and finish later.

Example approaches disclosed herein seek to normalize the amount of time taken for each training iteration by better distributing the training data among the nodes. Moreover, example approaches disclosed herein improve energy utilization for nodes that would have otherwise completed their training iteration early.

Figure 4:
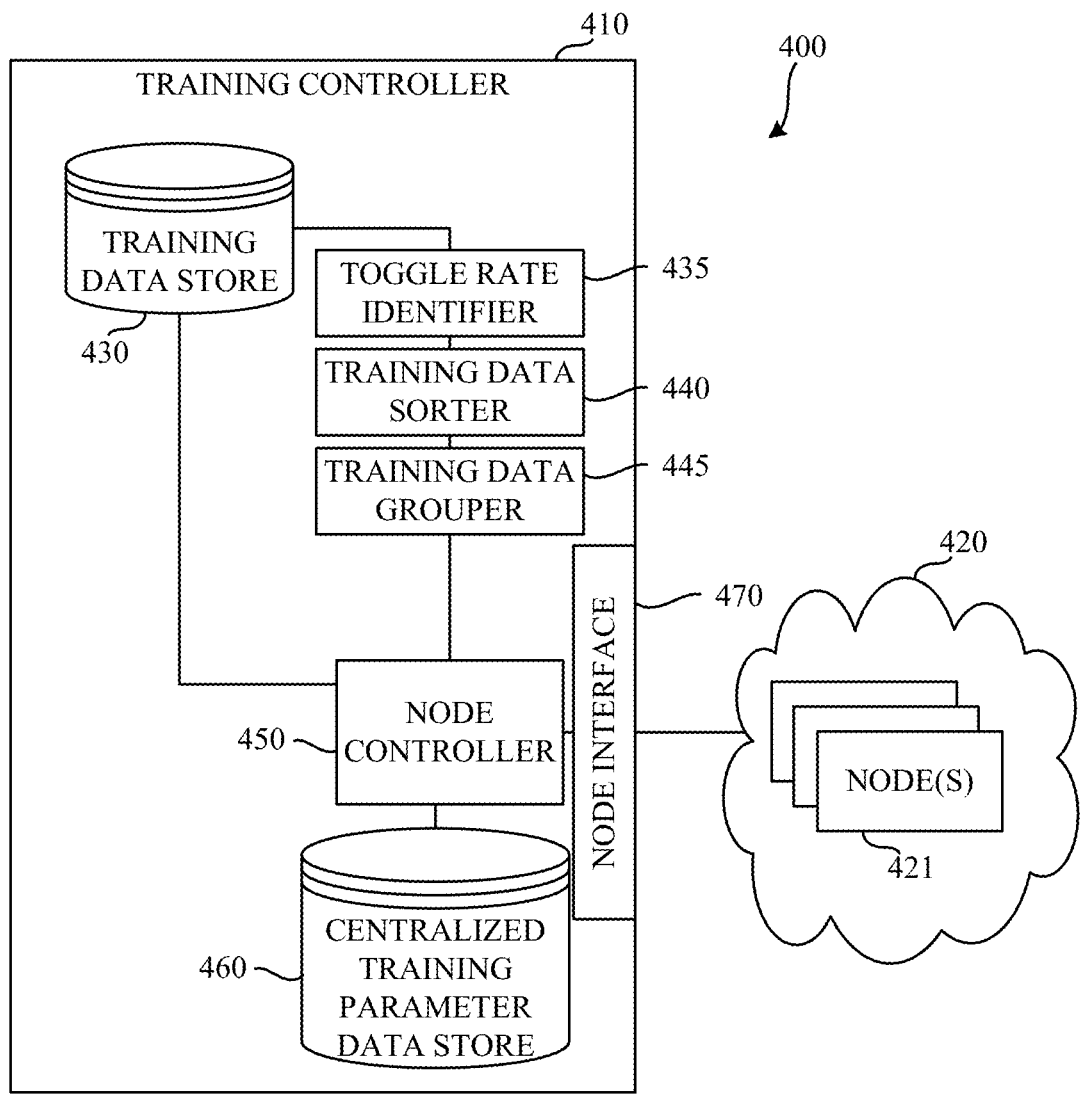
FIG. 4 is a block diagram of an example system constructed in accordance with the teachings of this disclosure to enable distributed training of a neural network.

FIG. 4 is a block diagram of an example system 400 constructed in accordance with the teachings of this disclosure to enable distributed training of a neural network. The example system 400 of the illustrated example of FIG. 4 includes a training controller 410 and a compute cluster 420. The example training controller 410 controls training operations of nodes in the cluster 420. In the illustrated example of FIG. 4, the example training controller 410 includes a training data store 430, a toggle rate identifier 435, a training data sorter 440, a training data grouper 445, a node controller 450, a centralized training parameter data store 460, and a node interface 470.

The example training data store 430 of the illustrated example of FIG. 4 is implemented by any memory, storage device and/or storage disc for storing data such as, for example, flash memory, magnetic media, optical media, etc. Furthermore, the data stored in the example training data store 430 may be in any data format such as, for example, binary data, comma delimited data, tab delimited data, structured query language (SQL) structures, etc. While in the illustrated example the training data store 430 is illustrated as a single element, the example training data store 430 and/or any other data storage elements described herein may be implemented by any number and/or type(s) of memories. In the illustrated example of FIG. 4, the example training data store 430 stores labeled training data that can be used by the example nodes when training a neural network. In some examples, the example training data store 430 stores a resultant model of the neural network. In examples disclosed herein, the training data includes data (e.g., images, documents, text, etc.) and tags and/or other classification information associated with the data.

The example toggle rate identifier 435 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example toggle rate determiner 435 determines a toggle rate for each item in the training data. In examples disclosed herein, the toggle rate corresponds to an amount of data variance in the data. In examples disclosed herein, the toggle rate is represented by a number between zero and one half (0.5). However, any other approach to representing an amount of data variance in a data item may additionally or alternatively be used.

The example training data sorter 440 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example training data sorter 440 of the illustrated example of FIG. 4 sorts the items in the training data store 430 by their corresponding toggle rate. In examples disclosed herein, the items are sorted in ascending order based on their corresponding toggle rates. However, any other sorting approach may additionally or alternatively be used.

The example training data grouper 445 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example training data grouper 445 of the illustrated example of FIG. 4 groups the sorted training data stored in the training data store 430 into groups.

The example training data grouper 445 determines a number of items to be included in each group, and determines a number of groups of training items to be created. In examples disclosed herein, the number of groups is calculated as the total number of items in the training data divided by the number of items to be included in each group. In some examples, the number of items to be included in each group may be determined based on a selected number of groups.

The example training data grouper 445 initializes a first index and a second index. The example training data grouper 445 selects an item for allocation to a group based on the first index and the second index, and allocates the selected item to a group identified by the first index. The example training data grouper 445 increments the second index, and proceeds to allocate items until the second index reaches the number of items to be included in each group.

When the example training data grouper 445 determines that the second index has reached the number of items to be included in each group, the training data grouper 445 shuffles the items allocated to the group identified by the first index. Shuffling the items allocated to the group identified by the first index ensures that the items allocated to the first group are in a random order. The example training data grouper 445 then increments the first index, and repeats the process until the first index reaches the number of groups.

The example node controller 450 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example node controller 450 of the illustrated example of FIG. 4 controls operations of the nodes in the cluster 420. Once the training data has been sorted and grouped based on toggle rates, the example node controller 450 initializes training parameters to be used among each of the nodes in the cluster 420. In examples disclosed herein, each of the nodes in the cluster 420 are initialized with the same training parameters. However, in some examples, different initial training parameters may be utilized at each of the nodes. The example node controller 450 stores the initialized training parameters in the centralized training parameter data store 460.

The example node controller 450 instructs each of the nodes in the cluster 420 to perform a training iteration. To perform a training iteration, each of the nodes in the cluster 420 selects a same number of items from the grouped training data (referred to herein as a mini-batch) to be used during the training iteration, performs training based on the selected mini-batch, and returns results of the training. In examples disclosed herein, one item is selected from each group. Because each group corresponds to different levels of toggle rates, and because each node in the cluster 420 selects a same number of items from each group, there will be approximately a same average toggle rate used at each of the nodes and, as a result, a similar amount of computation time encountered at each of the nodes.

Upon completion of the training iteration, each node in the cluster 420 reports the result of the training iteration to the node controller 450. In examples disclosed herein, the result includes gradients computed against the local mini-batch. The example node controller 450 receives the training results via the node interface 470. The example node controller 450 waits until training results have been received from each of the nodes that were performing the training iteration. Once training results have been received from each of the nodes, the example node controller 450 updates the training parameters stored in the centralized training parameter data store 460 based on the received results.

Using the reported results, the example node controller 450 then determines whether the training is complete. The example node controller 450 may determine the training is complete when, for example, the training results indicate that convergence has been achieved (e.g., gradient descent and/or error levels reported by each of the nodes are below an error threshold, a threshold number of training iterations of been performed, etc.) When the example node controller 450 determines that the training is not complete, the example node controller 450 synchronizes the updated training parameters to each of the nodes, and instructs each of the nodes to perform a subsequent training iteration. The example node controller 450 continues this process until the training is complete.

The example centralized training parameter data store 460 of the illustrated example of FIG. 4 is implemented by any memory, storage device and/or storage disc for storing data such as, for example, flash memory, magnetic media, optical media, etc. Furthermore, the data stored in the example centralized training parameter data store 460 may be in any data format such as, for example, binary data, comma delimited data, tab delimited data, structured query language (SQL) structures, etc. While in the illustrated example the centralized training parameter data store 460 is illustrated as a single element, the example centralized training parameter data store 460 and/or any other data storage elements described herein may be implemented by any number and/or type(s) of memories. In the illustrated example of FIG. 4, the centralized training parameter data store 460 stores training parameters (e.g., weights and/or biases) that are synchronized among the nodes during training.

The example node interface 470 of the illustrated example of FIG. 4 is implemented by a high speed fabric interface. In some examples, the example node interface 470 may be implemented by an Ethernet interface, a Remote Direct Memory Access (RDMA) interface, etc However, any other type of interface that enables the training controller to communicate with the nodes in the cluster 420 may additionally or alternatively be used.

The example cluster 420 of the illustrated example of FIG. 4 is illustrated as separate from the training controller 410. However, in some examples, the training controller 410 may be implemented by one or more of the nodes in the cluster 420. The example one or more nodes in the cluster 420 perform training tasks based on training data provided by the example node controller 450 of the training controller 410. An example implementation of a node 421 is described below in connection with FIG. 5. In examples disclosed herein, the one or more nodes in the cluster 420 each have similar specifications (e.g., processing specifications, memory specifications, neural network accelerator specifications, etc.). Having similar specifications across the nodes in the cluster 420 facilitates better predictability of compute times when balanced toggle rates are used among those nodes.

Figure 5:
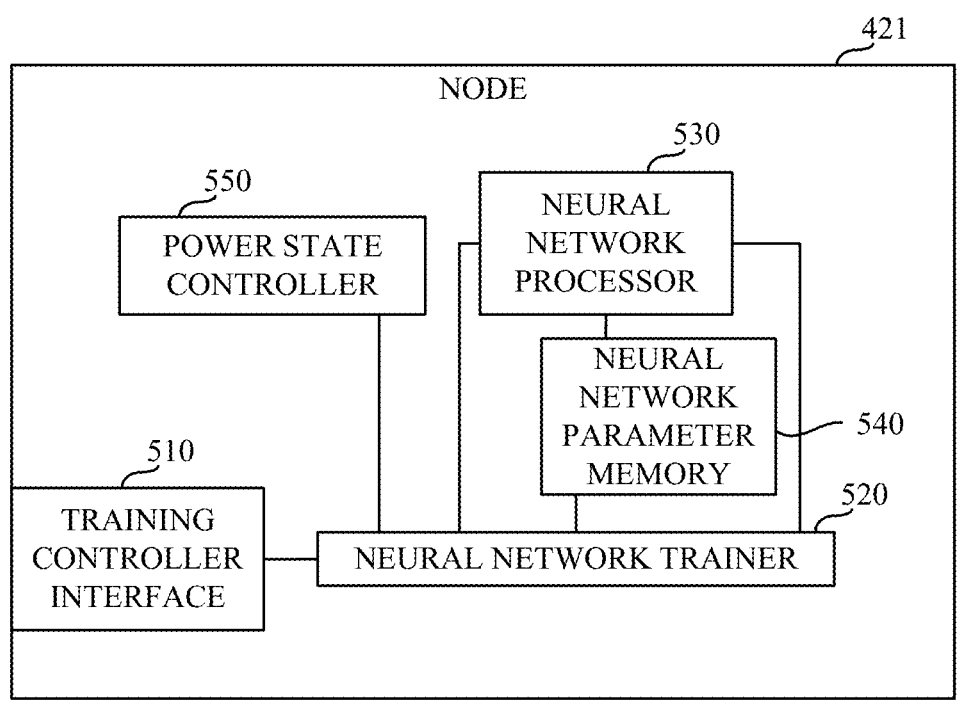
FIG. 5 is a block diagram of an example node of the example system of FIG. 4.

FIG. 5 is a block diagram of an example node 421 of the example system of FIG. 4. The example node 421 of the illustrated example of FIG. 5 includes a training controller interface 510, a neural network trainer 520, a neural network processor 530, neural network parameter memory 540, and a power state controller 550.

The example training controller interface 510 of the illustrated example of FIG. 5 is implemented by a high speed fabric interface. In some examples, the example training controller interface 510 may be implemented by an Ethernet interface, a Remote Direct Memory Access (RDMA) interface, etc. The example training controller interface 510 enables the example node 421 to communicate with the training controller 410 and or other nodes in the cluster 420. However, any other type of interface that enables the node 421 to communicate with the training controller 410 and/or other nodes in the cluster 420 may additionally or alternatively be used.

The example neural network trainer 520 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example neural network trainer 520 generates a mini-batch of items to be used in training at the node for a given iteration of the SGD process. In examples disclosed herein a mini-batch will include thirty-two to one thousand and twenty-four items. However, any other number of items may be included in the selected mini-batch. In examples disclosed herein, the example neural network trainer 520 selects an item from each group of the grouped training data. Because items in each group have similar toggle rates, when a similar number of items are selected among all the groups, each node generates its own mini-batch that, in the aggregate, has a similar toggle rate to other nodes.

Using the generated mini-batch, the example neural network trainer 520 instructs the neural network processor 530 to perform training of the neural network. During training, the example neural network trainer 520 provides the mini-batch of pre-labeled training data to the neural network processor 530. The example neural network processor 530 processes each item in the mini-batch and provides an output. The example neural network trainer 520 calculates a training error resulting from the processing performed by the example neural network processor 530 on the selected mini-batch. The training error quantifies how accurately the parameters stored in the neural network parameter memory 540 are able to classify the input. The example neural network trainer 520 then transmits, via the training controller interface 510, the results of the training to the training controller 410. Transmitting the results of the training to the training controller enables the results of all of the nodes to be aggregated and utilized when updating training parameters for subsequent iteration of the training process.

The example neural network processor 530 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In examples disclosed herein, the example neural network processor 530 implements a neural network. The example neural network of the illustrated example of FIG. 5 is a deep neural network (DNN). However, any other past, present, and/or future neural network topology(ies) and/or architecture(s) may additionally or alternatively be used such as, for example, a convolutional neural network (CNN), a feed-forward neural network. In examples disclosed herein, the deep neural network (DNN) utilizes multiple layers of artificial "neurons", each of which maps n real-valued inputs $x_j$ to a real-valued output v according to Equation 1, below:

$$v = \varphi\left(\sum_{j=1}^{n} w_j x_j + b\right)$$ Equation 1

In Equation 1, $w_j$ and b are weights and biases, respectively, associated with a given neuron, and φ is a nonlinear activation function, typically implemented by a rectified linear unit (ReLU) that clips negative values to zero but leaves positive values unchanged. In some examples, deep neural networks may utilize millions or even billions of such neurons, arranged in a layered fashion. For example, one layer of neurons is fed input data, its output is fed into another layer of neurons, and so on, until the output from the final layer of neurons is taken as the output of the network as a whole. In some examples, the shape of the connections between layers may vary. For example, a fully connected topology connects every output of layer L to each neuron of the next layer (e.g., L+1). In contrast, a convolutional layer includes only a small number of neurons that are swept across patches of the input data. Typically, the use of convolutional layers is useful when the input data has some sort of natural spatial interpretation such as, for example, the pixels in an image, the samples in a waveform, etc.

The example neural network parameter memory 540 of the illustrated example of FIG. 5 is implemented by any memory, storage device and/or storage disc for storing data such as, for example, flash memory, magnetic media, optical media, etc. Furthermore, the data stored in the example neural network parameter memory 540 may be in any data format such as, for example, binary data, comma delimited data, tab delimited data, structured query language (SQL) structures, etc. While in the illustrated example the neural network parameter memory 540 is illustrated as a single element, the neural network parameter memory 540 and/or any other data storage elements described herein may be implemented by any number and/or type(s) of memories. In the illustrated example of FIG. 5, the example neural network parameter memory 540 stores neural network weighting parameters that are used by the neural network processor 530 to process inputs for generation of one or more outputs.

The example power state controller 550 the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In examples disclosed herein, the example power state controller 550 controls a power state of a node to, in some examples, cause throttling of processing performed by the neural network processor 530. When processing is throttled (by way of selecting a reduced power state), compute time is increased. When throttled in a controlled manner, compute time can be controlled such that the node on which the power state controller 550 operates completes processing at approximately the same time as each of the other nodes in the cluster 420. Utilizing such an approach enables reduction(s) in energy consumption by placing into low-power state(s) those nodes that would have been likely to complete processing sooner than the other nodes.

In examples disclosed herein, each node has a set of N discrete power states that can be set at runtime. For example, a node may have three discrete power states that include states P0 (turbo), P1 (medium), and Pn (low). In examples disclosed herein, the example power state controller 550 determines an average toggle rate of items in the selected mini-batch. In some examples, the toggle rate is identified by reading values associated with the items of the selected mini-batch. However, in some examples, the power state controller 550 may process the items to determine the toggle rate. In examples disclosed herein, the example power state controller 550 determines the average toggle rate by adding toggle rates corresponding to each of the items in the selected mini-batch, and dividing the sum of those toggle rates by the number of items in the mini-batch.

The example power state controller 550 determines a number of available power states. In examples disclosed herein, lower numbered power states represent higher wattage power states, and higher numbered power states represent lower wattage power states. For example, a power state 0 represents a higher wattage power state than a power state 1. However, any other approach to arranging power states may additionally or alternatively be used.

The example power state controller 550 selects a power state based on the average toggle rate. In examples disclosed herein, the example power state controller 550 selects the power state by determining a number of available power states, and utilizing Equation 2, below:

$$[N*2*(0.5-T)]$$ Equation 2

In Equation 2, N represents the number of available power states, and T represents the average toggle rate of the mini-batch. As noted above, toggle rates are represented by a number between zero and one half. The square brackets in Equation 2 represent a function for selecting a closest integer value. Thus, the power state selection is performed by selecting a power state corresponding to a nearest integer of the product of the number of available power states, two, and a difference between the average toggle rate and one half. However, any other function for selecting a power state may additionally or alternatively be used such as, for example, a ceiling function, a floor function, etc.

As a result, when the toggle rate is high (e.g., approaching the maximum toggle rate (0.5)), a low numbered power state will be selected (corresponding to a higher wattage power state). Conversely, when the toggle rate is low (e.g., approaching the minimum toggle rate (0)), a high numbered power state will be selected (corresponding to a lower wattage power state). The example power state controller 550 sets the power state of the node 421 using the selected power state. In examples disclosed herein, the power state is selected by writing to a model specific register (MSR) that enables control of power states. Such a power state selection approach results in mini-batches with low toggle rates being throttled to conserve power, in an attempt to have all of the nodes complete the training iteration at approximately a same time.

While in examples disclosed herein, the toggle rate corresponds to the toggle rate of the mini-batch identified at the particular node 421, in some examples, such an approach may be implemented to consider mini-batch toggle rates of other nodes. Thus, for example, if all nodes happen to generate a low-toggle mini-batches, those nodes may operate at a high frequency, since no node is likely to "outrun" the others.

While an example manner of implementing the example training controller 410 is illustrated in FIG. 4 and an example manner of implementing the node 421 is illustrated in FIGS. 4 and/or 5, one or more of the elements, processes and/or devices illustrated in FIGS. 4 and/or 5 may be combined, divided, re-arranged, omitted, eliminated and/or implemented in any other way. Further, the example training data store 430, the example toggle rate identifier 435, the example training data sorter 440, the example training data grouper 445, the example node controller 450, the example centralized training parameter data store 460, the example node interface 470, and/or, more generally, the example training controller 410 of FIG. 4, and/or the example training controller interface 510, the example neural network trainer 520, the example neural network processor 530, the example neural network parameter memory 540, the example power state controller 550, and/or, more generally, the example node 421 of FIGS. 4 and/or 5 may be implemented by hardware, software, firmware and/or any combination of hardware, software and/or firmware. Thus, for example, any of the example training data store 430, the example toggle rate identifier 435, the example training data sorter 440, the example training data grouper 445, the example node controller 450, the example centralized training parameter data store 460, the example node interface 470, and/or, more generally, the example training controller 410 of FIG. 4, and/or the example training controller interface 510, the example neural network trainer 520, the example neural network processor 530, the example neural network parameter memory 540, the example power state controller 550, and/or, more generally, the example node 421 of FIGS. 4 and/or 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example training data store 430, the example toggle rate identifier 435, the example training data sorter 440, the example training data grouper 445, the example node controller 450, the example centralized training parameter data store 460, the example node interface 470, and/or, more generally, the example training controller 410 of FIG. 4, and/or the example training controller interface 510, the example neural network trainer 520, the example neural network processor 530, the example neural network parameter memory 540, the example power state controller 550, and/or, more generally, the example node 421 of FIGS. 4 and/or 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example training controller 410 of FIG. 4 and/or the example node 421 of FIGS. 4 and/or 5 may include one or more elements, processes and/or devices in addition to, or instead of, those illustrated in FIGS. 4 and/or 5, and/or may include more than one of any or all of the illustrated elements, processes and devices.

Figure 7:
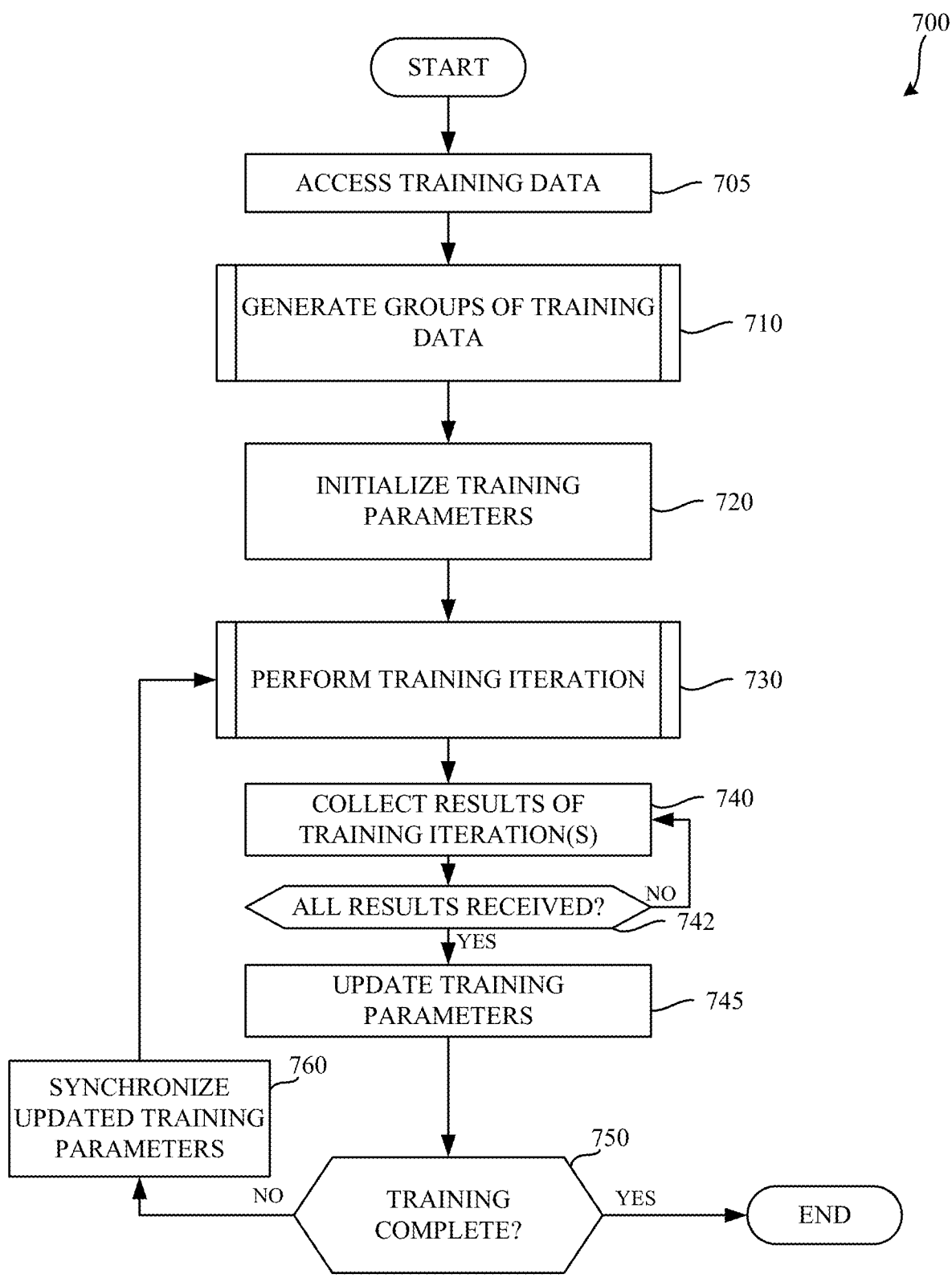
FIG. 7 is a flowchart representative of example machine readable instructions which may be executed to implement the example training controller of FIG. 4 to control distributed training of a neural network.

Flowcharts representative of example machine readable instructions for implementing the training controller 410 of FIG. 4 are shown in FIGS. 7 and/or 8. In these examples, the machine readable instructions comprise a program(s) for execution by a processor such as the processor 1312 shown in the example processor platform 1300 discussed below in connection with FIG. 13. The program may be embodied in software stored on a non-transitory computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program(s) is/are described with reference to the flowchart illustrated in FIGS. 7 and/or 8, many other methods of implementing the example training controller 410 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

Figure 9:
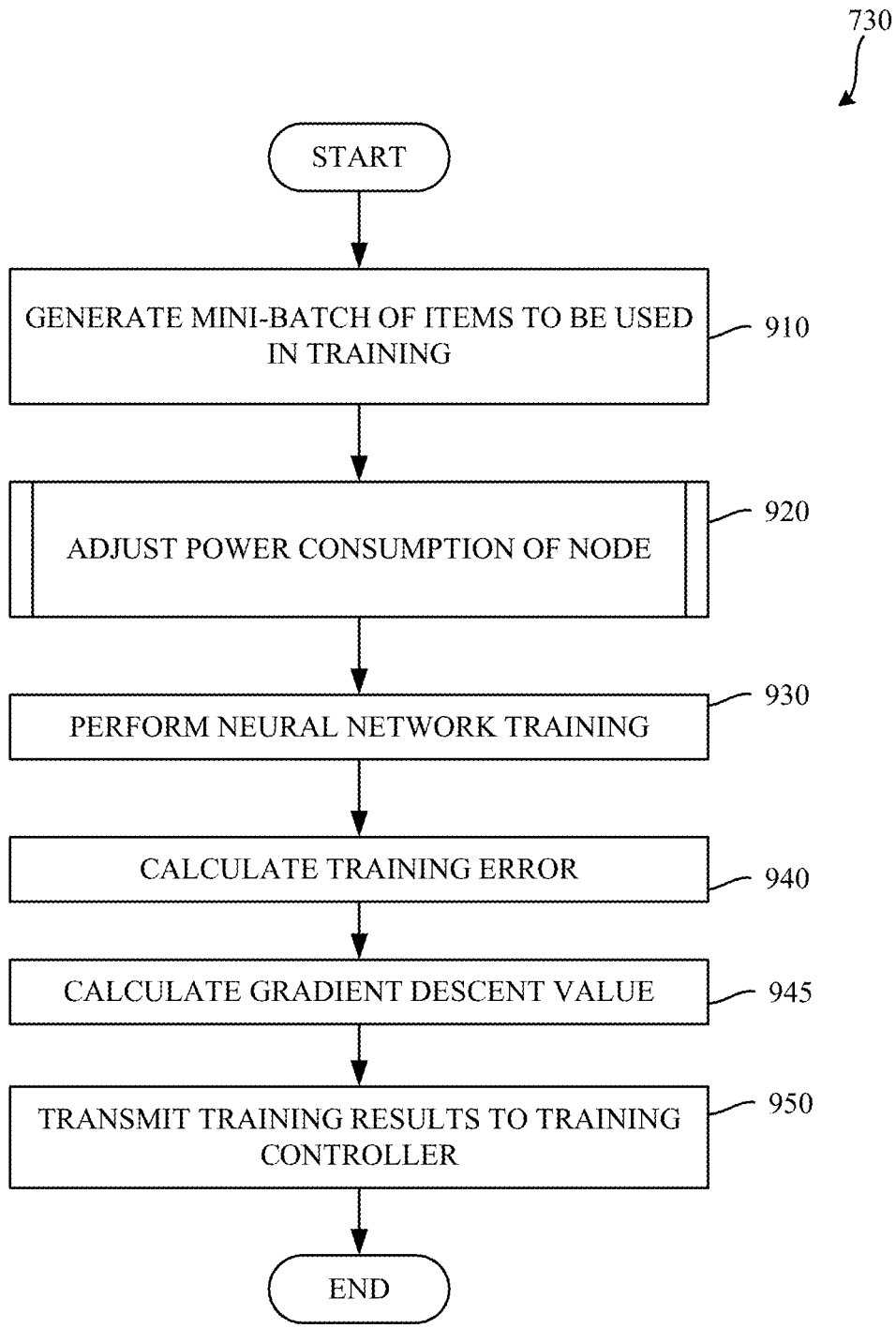
FIG. 9 is a flowchart representative of example machine readable instructions which may be executed to implement the example node of FIGS. 4 and/or 5 to perform a training iteration.

Flowcharts representative of example machine readable instructions for implementing the example node 421 of FIGS. 4 and/or 5 are shown in FIGS. 9 and/or 11. In these examples, the machine readable instructions comprise a program(s) for execution by a processor such as the processor 1412 shown in the example processor platform 1400 discussed below in connection with FIG. 14. The program may be embodied in software stored on a non-transitory computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program(s) is/are described with reference to the flowchart illustrated in FIGS. 9 and/or 11, many other methods of implementing the example node 421 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 7, 8, 9, and/or 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 6:
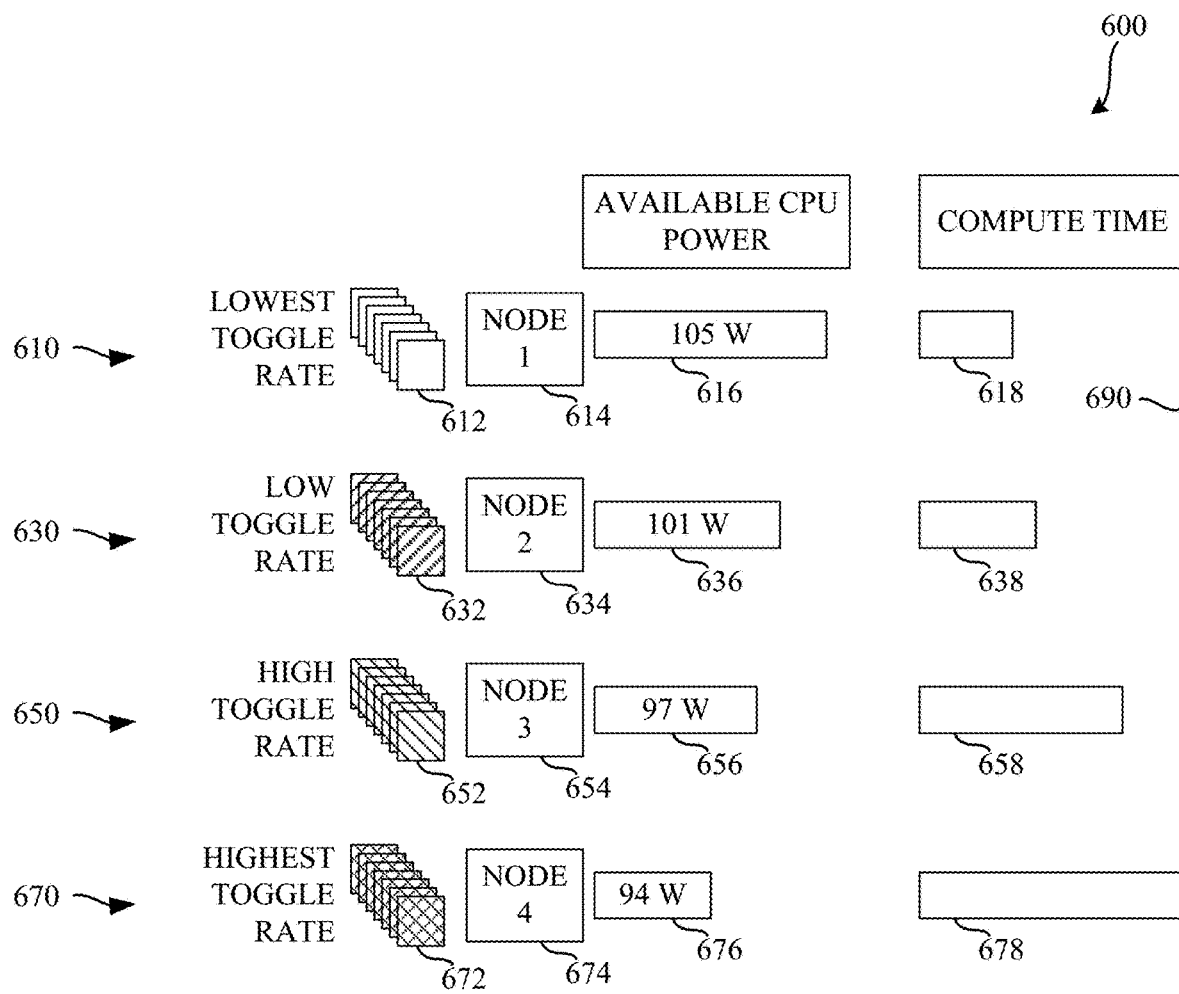
FIG. 6 is a diagram illustrating various amounts of compute time based on toggle rates and available central processing unit (CPU) power.

FIG. 6 is a diagram 600 illustrating various amounts of compute time based on toggle rates and available central processing unit (CPU) power. The diagram 600 of the illustrated example of FIG. 6 shows processing performed at four nodes 614, 634, 654, 674. In the illustrated example of FIG. 6, each of the nodes 614, 634, 654, 674 receives training data having different toggle rates. As a result, different amounts of processing power are available at each of the nodes, further resulting in different amounts of compute time being utilized among the nodes.

The example diagram 600 the illustrated example of FIG. 6 shows processing 610 performed at a first node 614 on training data having a lowest toggle rate 612. In the illustrated example of FIG. 6, the training data having the lowest toggle rate 612 results in the node 614 being able to allocate 105 watts of available CPU power for processing 616. As a result, the first node 614 processes the training data 612 in a lowest amount of time 618.

The example diagram 600 the illustrated example of FIG. 6 shows processing 630 performed at a second node 634 on training data having a low toggle rate 632. In the illustrated example of FIG. 6, the training data having the low toggle rate 632 results in the second node 634 being able to allocate 101 watts of available CPU power for processing 636. As a result, the second node 634 processes the training data 632 in a low amount of time 638. In the illustrated example of FIG. 6, the low amount of time 638 is greater than the lowest amount of time 618.

The example diagram 600 the illustrated example of FIG. 6 shows processing 650 performed at a third node 654 on training data having a high toggle rate 652. In the illustrated example of FIG. 6, the training data having the high toggle rate 652 results in the third node 654 being able to allocate 97 watts of available CPU power for processing 656. As a result, the third node 654 processes the training data 652 in a high amount of time 658. In the illustrated example of FIG. 6, the high amount of time 658 is greater than the lowest amount of time 618, and is greater than the low amount of time 638.

The example diagram 600 the illustrated example of FIG. 6 shows processing 670 performed at a fourth node 674 on training data having a highest toggle rate 672. In the illustrated example of FIG. 6, the training data having the highest toggle rate 672 results in the fourth node 674 being able to allocate 94 watts of available CPU power for processing 676. As a result, the fourth node 674 processes the training data 672 in a highest amount of time 678. In the illustrated example of FIG. 6, the highest amount of time 678 is greater than the lowest amount of time 618, is greater than the low amount of time 638, and is greater than the high amount of time 658.

In the illustrated example of FIG. 6, line 690 represents an amount of time taken for the training iteration. In the illustrated example of FIG. 6, line 690 corresponds to the end of the training computations performed by the fourth node 674 (e.g., the node with the training data having the highest toggle rate). Thus, while the first node 614, the second node 634, and the third node 654 utilized more available CPU power to complete their computations more quickly than the fourth node 674, their additional effort was wasted because the first node 614, the second node 634, and the third node 654 had to wait for the processing of the fourth node 676 to complete the training iteration before proceeding to the next training iteration.

To summarize FIG. 6, the toggle rate is correlated with the amount of compute time required for processing of training data assigned to a given node. Without utilizing the teachings of this disclosure, when the toggle rate is increased, longer amounts of time may be required for processing the training data.

FIG. 7 is a flowchart representative of example machine readable instructions which may be executed to implement the example training controller 410 of FIG. 4 to control distributed training of a neural network. The example process 700 the illustrated example of FIG. 7 begins when the example training controller 410 accesses training data. Block 705. In examples disclosed herein, the training data is stored in the training data store 430. However, in some examples, the training data may be located in a remote location (e.g., a remote server) and may, in some examples, be retrieved by the training controller 410. In some examples, the training data is provided to the training controller 410 without the training controller 410 actively retrieving the training data.

The example toggle rate identifier 435, the example training data sorter 440, and the example training data grouper 445 processes the training data stored in the example training data store 430 to generate groups of training data. (Block 710). An example approach to generating groups of training data is disclosed in further detail below in connection with FIG. 8. In short, the example toggle rate identifier 435 determines toggle rates for each item in the training data, the example training data sorter 440 sorts the items by their corresponding toggle rate, and the example training data grouper 445 arranges the training data into groups based on the identified and sorted toggle rates. Grouping based on sorted toggle rates enables a balanced set of training data to be provided to and/or selected by each node during training which, in turn, results in similar computation times across the nodes.

The example node controller 450 initializes training parameters used among each of the nodes in the cluster 420. (Block 720). In examples disclosed herein, each of the nodes in the cluster 420 are initialized with the same training parameters. The example node controller 450 stores the initialized training parameters in the centralized training parameter data store 460.

The example node controller 450 instructs each of the nodes in the cluster 420 to perform a training iteration. (Block 730). An example approach for performing a training iteration at a node is disclosed below in connection with FIG. 9. In short, each of the nodes in the cluster 420 selects a same number of items from the grouped training data to be used during the training iteration. In examples disclosed herein, one item is selected from each group. Because each group corresponds to different levels of toggle rates, and each node in the cluster selects a same number of items from each group, there will be approximately a same average toggle rate used at each of the nodes and, as a result, a similar amount of computation time used at each of the nodes. Using the selected mini-batch(es), each node in the cluster 420 performs neural network training, and reports a result of the training.

Upon completion of the training iteration, each node in the cluster 420 reports the result of the training iteration. In examples disclosed herein, the result includes gradients computed against the local mini-batch. The example node controller 450 receives the training results via the node interface 470. (Block 740). The example node controller 450 waits until training results have been received from each of the nodes that were performing the training iteration. (Block 742). If the example node controller 450 determines that there are additional results of training iteration(s) to be received (e.g. block 742 returns a result of NO), the example node controller 450 continues to collect the results of the training iterations. (Block 740). Once training results have been received from each of the nodes, the example node controller 450 updates the training parameters stored in the centralized training parameter data store 460 based on the received results.

In some examples, the nodes operate in a decentralized fashion and, instead of communicating their results to a centralized training data store, communicate with the other nodes to synchronize training data using, for example, an all-reduce algorithm. For example, each node takes the sum of the results of each of the nodes (e.g., the gradients), and applies the sum of the results to a locally held copy of the weights and biases as usual. In this manner, each node is assured to be working with the same weights and biases throughout the process.

The example node controller 450 then determines whether the training is complete. (Block 750). The example node controller 450 may determine the training is complete when, for example, the training results indicate that convergence has been achieved (e.g., gradient and/or error levels reported by each of the nodes are below an error threshold, a threshold number of training iterations have been performed, etc.) When the example node controller 450 determines that the training is not complete (e.g., block 750 returns a result of NO), the example node controller 450 synchronizes the updated training parameters to each of the nodes. (Block 760). The node controller 450 then instructs each of the nodes to perform a subsequent training iteration. (Block 730). The example process of blocks 730 through 760 is repeated until the example node controller 450 identifies that the training is complete (e.g., until block 750 returns a result of YES). Upon completion of training, the neural network parameters derived via the training may be re-used in a neural network to process and/or classify other data.

Figure 8:
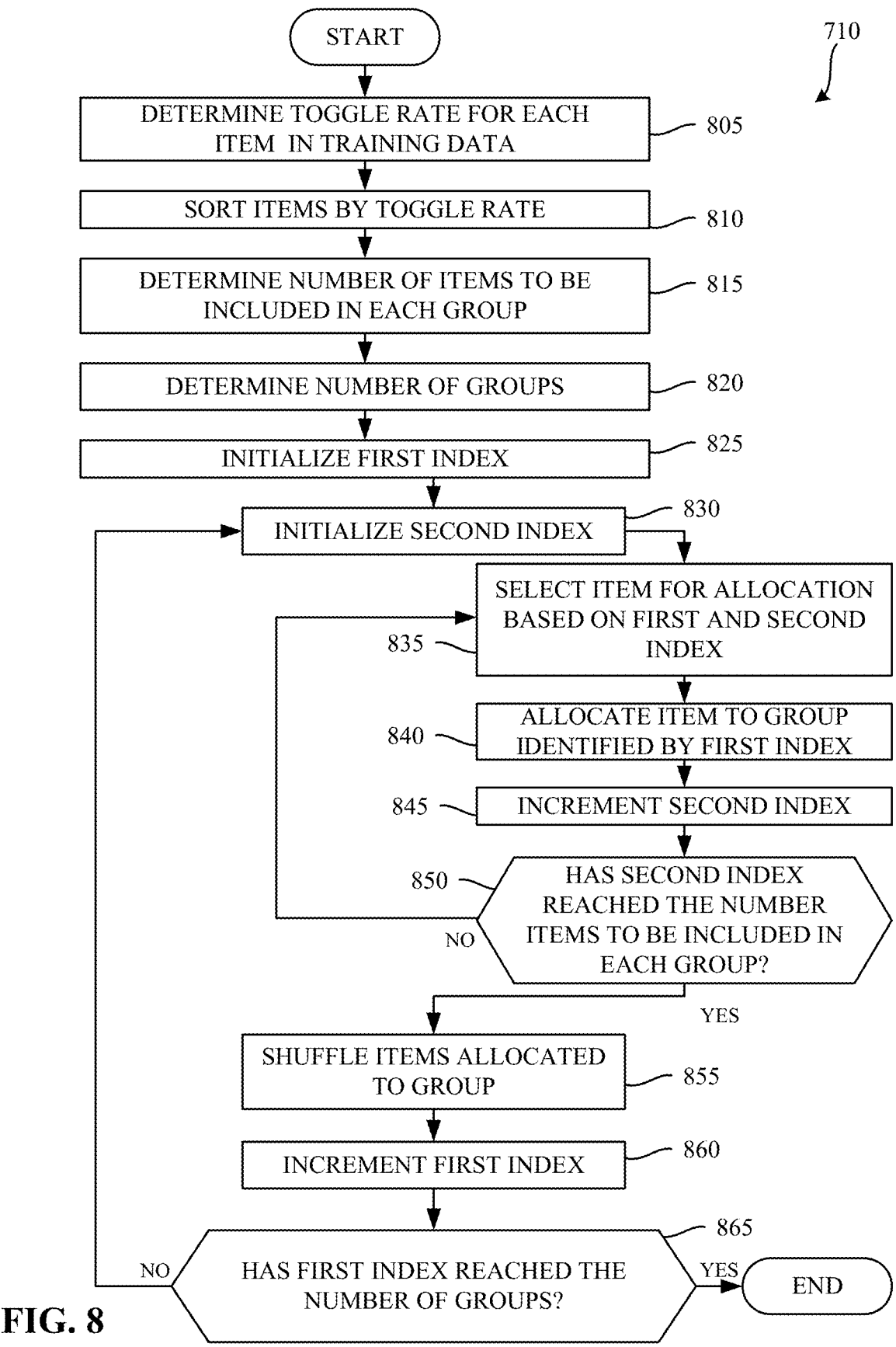
FIG. 8 is a flowchart representative of example machine readable instructions which may be executed to implement the example training controller of FIG. 4 to generate groups of training data.

FIG. 8 is a flowchart representative of example machine readable instructions which may be executed to implement the example training controller of FIG. 4 to generate groups of training data. The example process 710 of the illustrated example of FIG. 8 represents an example approach to generating groups of training data described in connection with block 710 of FIG. 7. The example process 710 of the illustrated example of FIG. 8 begins when the example toggle rate identifier 435 determines a toggle rate for each item in the training data. (Block 805). In examples disclosed herein, the toggle rate is represented by a number between zero and one half (0.5). However, any other approach to representing an amount of data variance in a training item may additionally or alternatively be used.

The example training data sorter 440 sorts the items by their corresponding toggle rate. (Block 810). In examples disclosed herein, the items are sorted in ascending order based on their toggle rates. However, any other sorting approach may additionally or alternatively be used.

The example training data grouper 445 determines a number of items to be included in each group. (Block 815). The example training data grouper 445 determines a number of groups of training items to be created. (Block 820). In examples disclosed herein, the number of groups is calculated as the total number of items in the training data divided by the number of items to be included in each group. While in the illustrated example of FIG. 8 the number of groups is determined based on the number of items to be included in each group, in some examples the number of items to be included in each group may be determined based on a selected number of groups.

The example training data grouper 445 initializes a first index. (Block 825). The example training data grouper 445 initializes a second index. (Block 830). The example training data grouper 445 then selects an item for allocation to a group based on the first index and the second index. (Block 835). The example training data grouper 445 allocates the selected item to a group identified by the first index. The example training data grouper 445 increments the second index. (Block 845). The example training data grouper 445 determines whether the second index has reached the number of items to be included in each group. (Block 850). In examples disclosed herein, if the example training data grouper 445 determines that the second index has not reached the number of items to be included in each group (e.g., block 850 returns a result of NO), the example process of blocks 835 through 850 is repeated until the second index reaches the number of items to be included in each group (e.g., until block 850 returns a result of YES).

When the example training data grouper 445 determines that the second index has reached the number of items to be included in each group (e.g., block 850 returns a result of YES), the training data grouper 445 shuffles the items allocated to the group identified by the first index. (Block 855). Shuffling the items allocated to the group identified by the first index ensures that the items allocated to the first group are in a random order. The example training data grouper 445 then increments the first index. (Block 860). The example training data grouper 445 then determines whether the first index has reached the number of groups. (Block 865). If the first index has not reached the number of groups (e.g., block 865 returns a result of NO), the example process of blocks 830 through 865 is repeated until the training items are allocated to each group. If the training data grouper 445 determines that the first index has reached the number of groups (e.g., block 865 returns a result of YES), the example process of FIG. 8 terminates. Control returns to block 720 of FIG. 7, where training parameters are initialized.

FIG. 9 is a flowchart representative of example machine readable instructions which may be executed to implement the example node 421 of FIGS. 4 and/or 5 to perform a training iteration. The example process 730 of the illustrated example of FIG. 9 begins when the example neural network trainer 520 generates a mini-batch of items to be used in training. (Block 910). In examples disclosed herein a mini-batch will include thirty-two to one thousand and twenty-four items. However, any other number of items may be included in the selected mini-batch. In examples disclosed herein, the example neural network trainer 520 selects an item from each group of the grouped training data. Because items in each group have similar toggle rates, when a similar number of items are selected among all the groups, each node generates its own mini-batch that, in the aggregate, has a similar toggle rate to other nodes.

In some examples, the example power state controller 550 optionally adjusts a power state of the processor of the node 421. (Block 920). Adjusting the power state of the processor of the node 421 enables the node to account for minor variations in the average toggle rate of the selected mini-batch. If, for example, the average toggle rate of the mini-batch were low, the node might be throttled in an effort to complete its computations at a same time as the other nodes (e.g., to not finish too early as a result of using a high wattage power state). An example approach for adjusting a power state of the node 421 is described further in connection with FIG. 12.

The example neural network trainer 520 instructs the neural network processor 530 to perform training of the neural network. (Block 930). During training, the example neural network trainer 520 provides the mini-batch of pre-labeled training data (typically somewhere between 32 and 1024 images at a time) to the neural network processor 530. The example neural network processor 530 processes each item in the mini-batch and provides an output. The example neural network trainer 520 calculates a training error resulting from the processing performed by the example neural network processor 530 on the selected mini-batch. The training error quantifies how accurately the parameters stored in the neural network parameter memory 540 are able to classify the input via a differentiable loss or error function (E). This process is called forward propagation. The example neural network trainer 520 then computes a gradient descent value ∂/∂w (E) of the loss function with respect to the current weights w. (Block 945). In some examples, using the gradients, weights are updated according to Equation 3, below, where w' are the updated weights, w are the weights prior to the adjustment process and θ is a tunable parameter called a learning rate.

$$w' = w - \theta \frac{\partial}{\partial w}(E) \quad \text{Equation 3}$$

Since each neural network layer is a differentiable function of the layer that precedes it, the gradients may be computed layer-by-layer, moving from output to input, in a process called backward propagation.

The example neural network trainer 520 then transmits, via the training controller interface 510, the results of the training (e.g., the weights and/or the gradients) to the training controller 410. Transmitting the results of the training to the training controller enables the results of all of the nodes to be aggregated and utilized when updating training parameters for subsequent iterations of the training process. The example process 730 of the illustrated example of FIG. 9 then terminates. Control returns to block 740 of FIG. 7, where the example node controller collects results of the training iteration from the nodes in the cluster 420. The example process 730 of the illustrated example of FIG. 9 may then be repeated to perform a subsequent training iteration of the training process.

Figure 10:
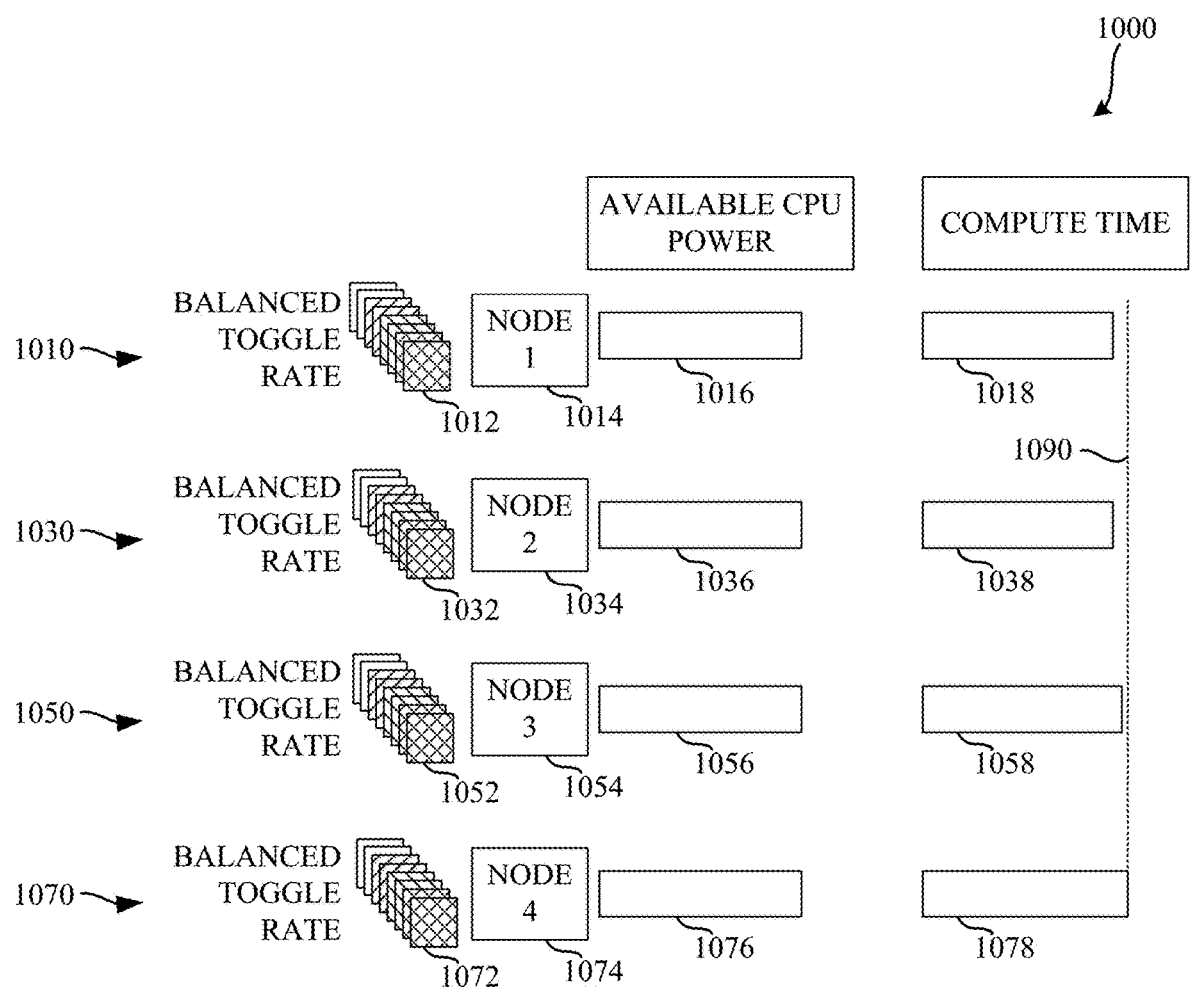
FIG. 10 is a diagram illustrating various amounts of compute time based on the use of balanced toggle rates described in connection with FIGS. 7, 8, and/or 9.

FIG. 10 is a diagram illustrating various amounts of compute time based on the use of balanced toggle rates described in connection with FIGS. 7, 8, and/or 9. The diagram 1000 of the illustrated example of FIG. 10 shows processing performed at four nodes 1014, 1034, 1054, 1074. In the illustrated example of FIG. 10, each of the nodes 1014, 1034, 1054, 1074 receives training data having a balanced toggle rate. As a result, similar amounts of processing power are available at each of the nodes, further resulting in similar amounts of compute time being utilized among the nodes. While in the illustrated example of FIG. 10, the toggle rates are balanced among the nodes, the mini-batches used by each of the nodes are not identical and, as a result, might have slightly different toggle rates, resulting in slightly different amounts of processing time. However, the differences in processing time for a given iteration are minimized.

The example diagram 1000 the illustrated example of FIG. 10 shows processing 1010, 1030, 1050, 1070 performed at a first node 1014, a second node 1034, a third node 1054, and a fourth node 1074, on mini-batches of training data having a balanced toggle rates 1012, 1032, 1052, 1072, respectively. In the illustrated example of FIG. 10, because the toggle rates are balanced, the amount of available CPU power 1016, 1036, 1056, 1076 are balanced as well, resulting in similar amounts of compute time 1018, 1038, 1058, 1078.

In the illustrated example of FIG. 10, line 1090 represents an amount of time taken for the training iteration. In the illustrated example of FIG. 10, line 1090 corresponds to the end of the training computations performed by the fourth node 1074. In contrast to the example diagram 600 of FIG. 6, differences in compute time(s) are minimized, resulting in a reduction in the amount of time where the node is idle before proceeding to the next training iteration.

To summarize FIG. 10, when toggle rates of mini-batches are balanced, the resultant compute times are likewise balanced, thereby reducing the amount of time that nodes that complete early must wait before proceeding to the next training iteration.

Figure 11:
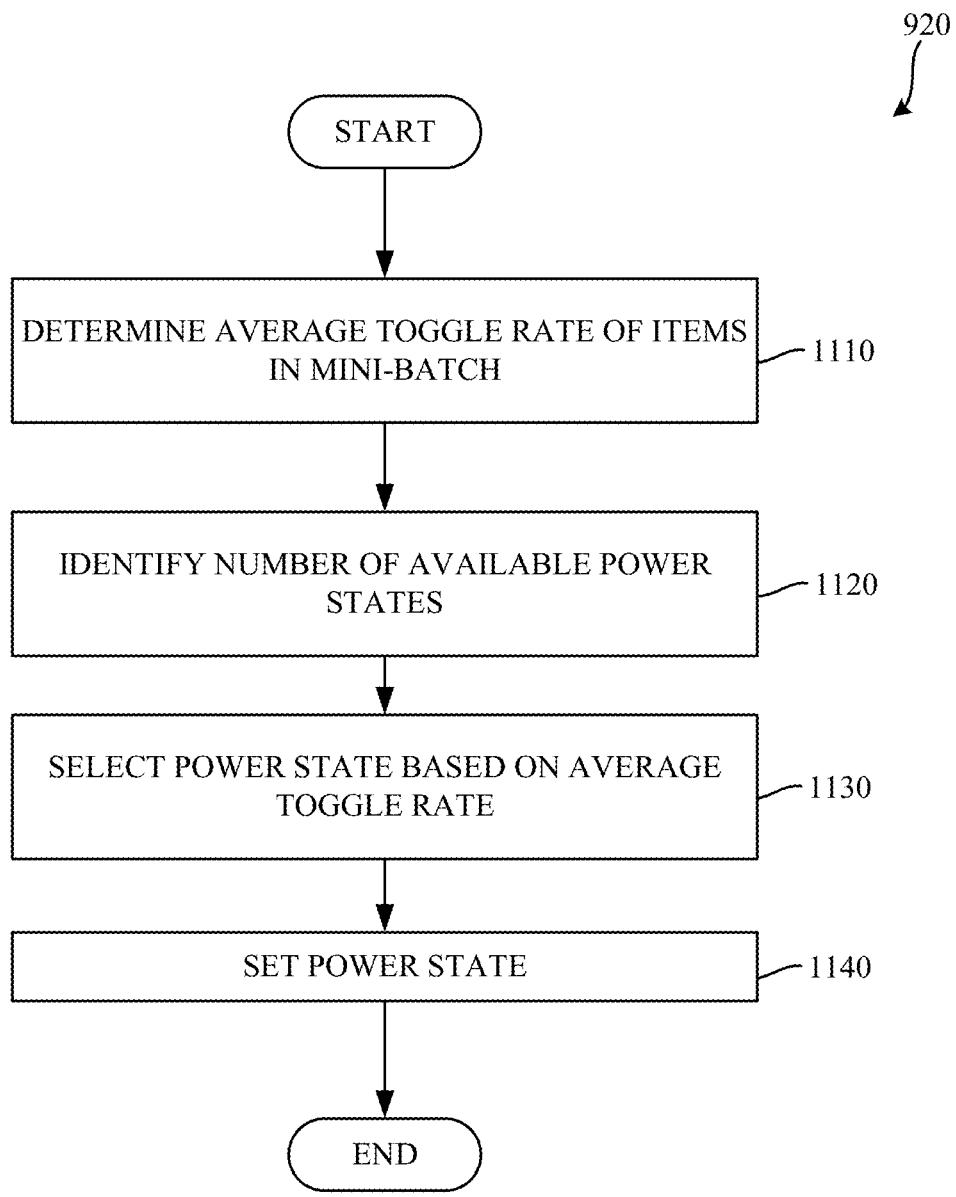
FIG. 11 is a flowchart representative of example machine readable instructions which may be executed to implement the example node of FIGS. 4 and/or 5 to select a power state for use in a training iteration.

FIG. 11 is a flowchart representative of example machine readable instructions which may be executed to implement the example node 421 of FIGS. 4 and/or 5 to select a power state for use in a training iteration. The example process 920 of the illustrated example of FIG. 11 begins when the example power state controller 550 determines an average toggle rate of items in the selected mini-batch. (Block 1110). In examples disclosed herein, the example power state controller 550 determines the average toggle rate by adding toggle rates corresponding to each of the items in the selected mini-batch, and dividing the sum of those toggle rates by the number of items in the mini-batch.

The example power state controller 550 determines a number of available power states. (Block 1120). In examples disclosed herein, lower numbered power states represent higher wattage power states, and higher numbered power states represent lower wattage power states. For example, a power state 0 represents a higher wattage power state than a power state 1.

The example power state controller 550 then selects a power state based on the average toggle rate. (Block 1130). In examples disclosed herein, the example power state controller 550 selects the power state by determining a number of available power states, and utilizing Equation 4, below:

$$[N*2*(0.5-T)] \quad \text{Equation 4}$$

In Equation 4, N represents the number of available power states, and T represents the average toggle rate of the mini-batch. As noted above, toggle rates are represented by a number between zero and one half. The square brackets in Equation 4 represent a function for selecting a closest integer value. Thus, the power state selection is performed by selecting a power state corresponding to a nearest integer of the product of the number of available power states, two, and a difference between the average toggle rate and one half. As a result, when the toggle rate is high (e.g., approaching the maximum toggle rate (0.5)), a low numbered power state will be selected (corresponding to a higher wattage power state). Conversely, when the toggle rate is low (e.g., approaching the minimum toggle rate (0)), a high numbered power state will be selected (corresponding to a lower wattage power state). The example power state controller 550 then sets the power state of the node 421. (Block 1140). Such a power state selection approach results in mini-batches with low toggle rates being throttled to conserve power, in an attempt to have all of the nodes complete the training iteration at approximately a same time.

In the illustrated example of FIG. 11, the toggle rate corresponds to the toggle rate of the mini-batch identified at the particular node 421. However, in some examples, such an approach may be implemented to consider mini-batch toggle rates of other nodes. Thus, for example, if all nodes happen to generate a low-toggle mini-batches, those nodes may operate at a high frequency, since no node is likely to "outrun" the others.

Figure 12:
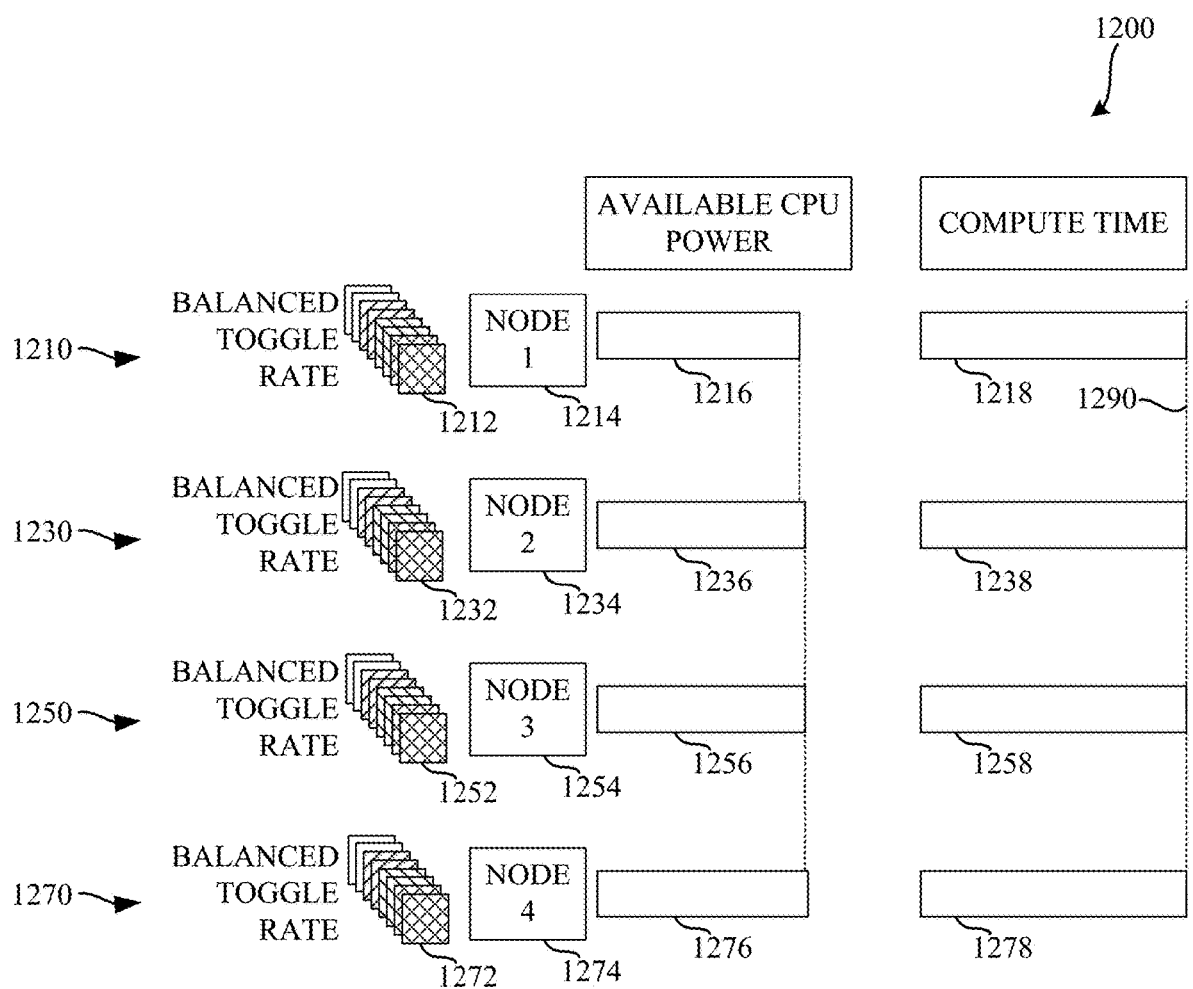
FIG. 12 is a diagram illustrating various amounts of compute time based on the use of balanced toggle rates and selected power states described in connection with FIGS. 7, 8, 9, and/or 11.

FIG. 12 is a diagram illustrating various amounts of compute time based on the use of balanced toggle rates and selected power states described in connection with FIGS. 7, 8, 9, and/or 11. The diagram 1200 of the illustrated example of FIG. 12 shows processing performed at four nodes 1214, 1234, 1254, 1274. In the illustrated example of FIG. 12, each of the nodes 1214, 1234, 1254, 1274 receives training data having a balanced toggle rate. As a result, similar amounts of processing power are available at each of the nodes, further resulting in similar amounts of compute time being utilized among the nodes. While in the illustrated example of FIG. 12, the toggle rates are balanced among the nodes, the mini-batches used by each of the nodes are not identical and, as a result, might have slightly different toggle rates, resulting in slightly different amounts of processing time. However, the differences in processing time for a given iteration are minimized as a result of the power state control.

The example diagram 1200 the illustrated example of FIG. 12 shows processing 1210, 1230, 1250, 1270 performed at a first node 1214, a second node 1234, a third node 1254, and a fourth node 1274, on mini-batches of training data having a balanced toggle rates 1212, 1232, 1252, 1272, respectively. As shown in the example diagram 1000 of the illustrated example of FIG. 10, when the toggle rates are balanced, the amounts of compute time are likewise balanced. However, as also noted in connection with FIG. 10, while the toggle rates are balanced, there can still be minor variations in the toggle rates among each of the nodes. As discussed in connection with FIG. 11, power consumption at each of the nodes can be controlled to throttle an amount of compute time required (while reducing power consumed at the node).

In the illustrated example of FIG. 12, power consumed by the first node 1216 is reduced to a first level based on the toggle rate 1212 of the mini-batch used by the first node 1214. Reducing the power consumed by the first node 1214 ensures that the first node will complete the training iteration at approximately the same time as the other nodes. Similar throttling is also applied at the second node 1234, the third node 1254, and the fourth node 1274.

In the illustrated example of FIG. 12, line 1290 represents an amount of time taken for the training iteration. In the illustrated example of FIG. 12, line 1290 corresponds to the end of the training computations performed by the fourth node 1274. In contrast to the example diagram 600 of FIG. 6, as well as the example diagram 1000 of FIG. 10, differences in compute time(s) are minimized, resulting in a reduction in the amount of time where the node is idle before proceeding to the next training iteration.

To summarize FIG. 12, while using balanced toggle rates is beneficial for balancing compute times, minor variations in the toggle rates can likewise cause minor variations in the compute times. By adjusting an amount of CPU power available, those differences in compute times can be further reduced, while also reducing an amount of power consumed by the nodes.

Figure 13:
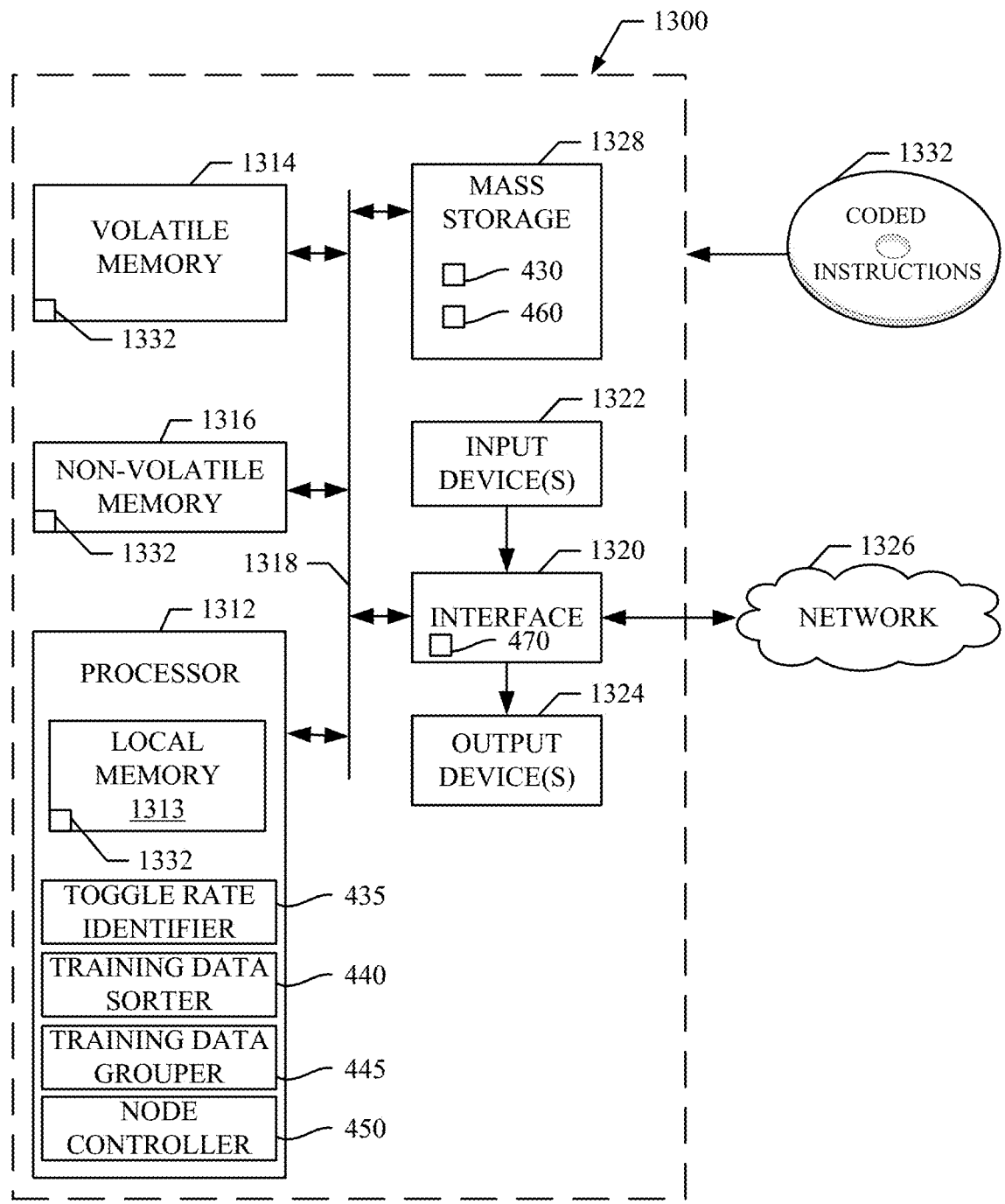
FIG. 13 is a block diagram of an example processing platform structured to execute the instructions of FIGS. 7 and/or 8 to implement the example training controller of FIG. 4.

FIG. 13 is a block diagram of an example processor platform 1300 capable of executing the instructions of FIGS. 7 and/or 8 to implement the training controller 410 of FIG. 4. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. The hardware processor may be a semiconductor based (e.g., silicon based) device. In this example, the processor 1312 implements the example toggle rate identifier 435, the example training data sorter 440, the example training data grouper 445, and/or the example node controller 450.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, InfiniBand Interface, Omni-Path Architecture Interface, a universal serial bus (USB), and/or a PCI express interface. The example interface circuit 1320 may implement the example node interface 470.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, a sensor, an isopoint, and/or a voice recognition system.

One or more output devices 1324 are also connected to the interface circuit 1320 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 7 and/or 8 may be stored in the mass storage device 1328, in the volatile memory 1314, in the non-volatile memory 1316, and/or on a removable tangible computer readable storage medium such as a CD or DVD. The example mass storage device 1328 may implement the example training data store 430 and/or the example centralized training parameter data store 460.

Figure 14:
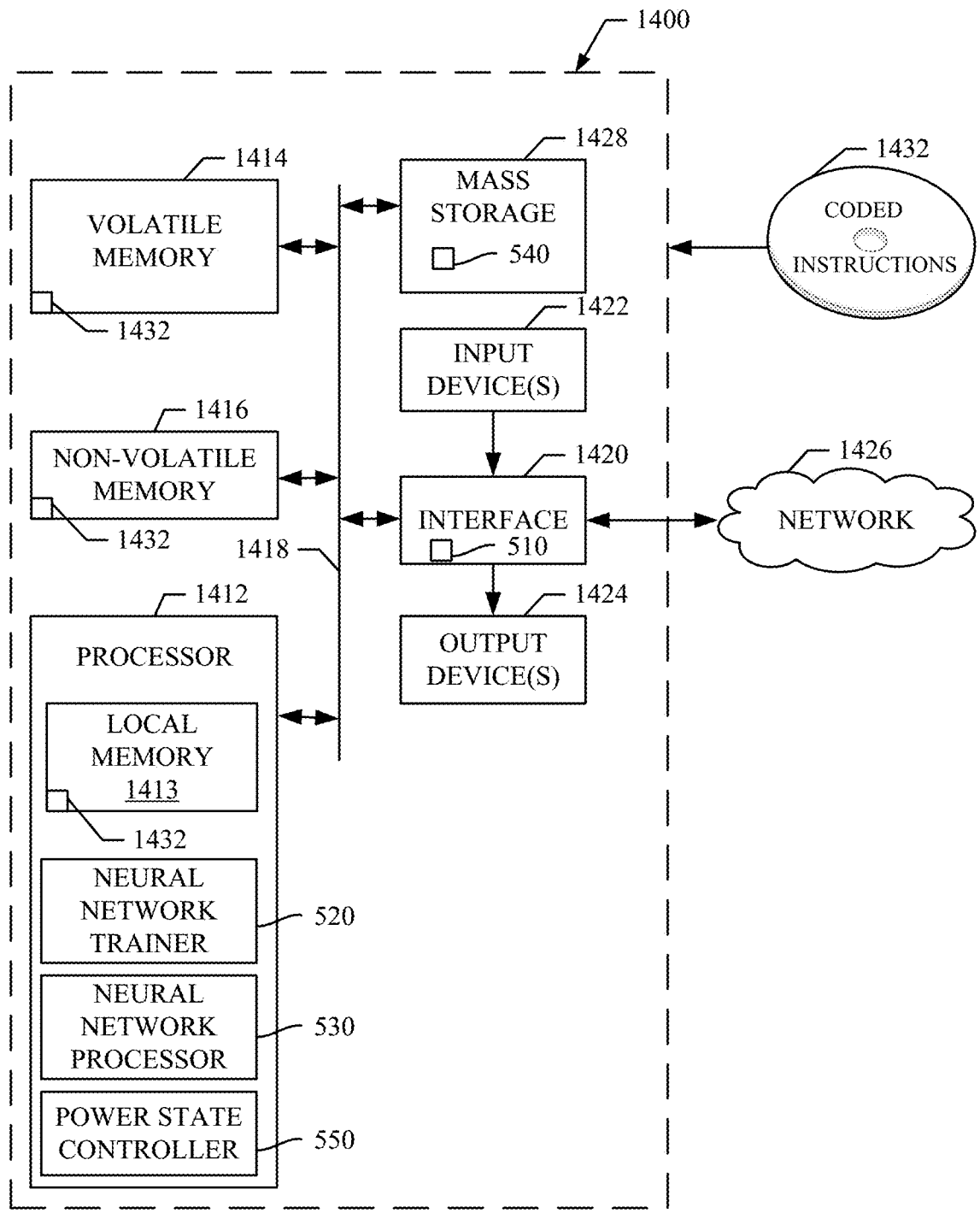
FIG. 14 is a block diagram of an example processing platform structured to execute the instructions of FIGS. 7, 8, 9, and/or 11 to implement the example node of FIGS. 4 and/or 5.

FIG. 14 is a block diagram of an example processor platform 1400 capable of executing the instructions of FIGS. 7, 8, 9, and/or 11 to implement the example node 421 of FIGS. 4 and/or 5. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. The hardware processor may be a semiconductor based (e.g., silicon based) device. In this example, the processor 1412 implements the example neural network trainer 520, the example neural network processor 530, and/or the example power state controller 550.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.). The example interface circuit 1420 implements the example training controller interface 510.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 9 and/or 11 may be stored in the mass storage device 1428, in the volatile memory 1414, in the non-volatile memory 1416, and/or on a removable tangible computer readable storage medium such as a CD or DVD. The example mass storage device 1428 implements the example neural network parameter memory 540.

Example 1 includes an apparatus for distributed training of neural networks, the apparatus comprising a neural network trainer to select a plurality of training data items from a training data set based on a toggle rate of each item in the training data set, a neural network parameter memory to store neural network training parameters, and a neural network processor to implement a neural network to generate training data results from distributed training over a plurality of nodes of the neural network using the selected training data items and the neural network training parameters, the neural network trainer to synchronize the training data results and to update the neural network training parameters based on the synchronized training data results.

Example 2 includes the apparatus of example 1, further including a power state controller to control an amount of power consumption of a central processing unit of the apparatus based on an average toggle rate of the training data items in the selected training data items.

Example 3 includes the apparatus of example 1, further including a toggle rate identifier to determine a toggle rate for each item of training data in the training data set, a training data sorter to sort the items in the training data by their corresponding toggle rate, and a training data grouper to allocate a first number of items of the sorted items to a first group, and to allocate a second number of items of the sorted items to a second group, the second number of items being sequentially located after the first number of items in the sorted training data, the selection of the plurality of training data items being performed among the first group and the second group.

Example 4 includes the apparatus of example 3, wherein the training data grouper is further to shuffle the items allocated to the first group within the first group.

Example 5 includes the apparatus of any one of examples 1-4, wherein the toggle rate associated with a training data item represents an amount of data variance within the training data item.

Example 6 includes the apparatus of example 1, wherein the neural network is implemented as a deep neural network.

Example 7 includes the apparatus of example 1, wherein the training data items include image data.

Example 8 includes a non-transitory computer readable medium comprising instructions which, when executed, cause a machine to at least select a plurality of training items based on a toggle rate of training data items in a training data set, perform neural network training using the selected plurality of training data items and stored training parameters to determine training results, synchronize the training results with other nodes involved in distributed training, and update stored training parameters based on the synchronized training results.

Example 9 includes the non-transitory computer readable medium of example 8, wherein the instructions, when executed, cause the machine to at least determine a toggle rate for each item of training data in the training data set, sort the items in the training data by their corresponding toggle rate, allocate a first number of items of the sorted items to a first group, and allocate a second number of items of the sorted items to a second group, the second number of items being sequentially located after the first number of items in the sorted training data.

Example 10 includes the non-transitory computer readable medium of example 9, further including shuffling the items allocated to the first group within the first group.

Example 11 includes the non-transitory computer readable medium of any one of examples 9-10, wherein the toggle rate associated with a training data item represents an amount of data variance within the training item.

Example 12 includes the non-transitory computer readable medium of example 8, wherein the instructions, when executed, cause the machine to at least determine an average toggle rate of the items in the plurality of training items, select a power state based on the average toggle rate, and apply the selected power state to the machine.

Example 13 includes the non-transitory computer readable medium of example 8, wherein the training data items include image data.

Example 14 includes a method for distributed training of neural networks, the method comprising selecting, by executing an instruction with a processor of a node, a plurality of training items based on a toggle rate of training data items in a training data set, performing, by executing an instruction with the processor of the node, neural network training using the selected plurality of training data items and stored training parameters to determine training results, synchronizing the training results with other nodes involved in distributed training, and updating stored training parameters based on the synchronized training results.

Example 15 includes the method of example 14, wherein the selecting of the plurality of training items includes determining a toggle rate for each item of training data in the training data set, sorting the items in the training data by their corresponding toggle rate, allocating a first number of items of the sorted items to a first group, and allocating a second number of items of the sorted items to a second group, the second number of items being sequentially located after the first number of items in the sorted training data.

Example 16 includes the method of example 15, further including shuffling the items allocated to the first group within the first group.

Example 17 includes the method of any one of examples 14-16, wherein the toggle rate associated with a training data item represents an amount of data variance within the training item.

Example 18 includes the method of example 14, further including determining, by executing an instruction with the processor of the node, an average toggle rate of the items in the plurality of training items, selecting, by executing an instruction with the processor of the node, a power state based on the average toggle rate, and applying, by executing an instruction with the processor of the node, the selected power state to the node.

Example 19 includes an apparatus for distributed training of neural networks, the apparatus comprising means for selecting, by executing an instruction with a processor of a node, a plurality of training items based on a toggle rate of training data items in a training data set, means for performing, by executing an instruction with the processor of the node, neural network training using the selected plurality of training data items and stored training parameters to determine training results, means for synchronizing the training results with other nodes involved in distributed training, and means for updating stored training parameters based on the synchronized training results.

Example 20 includes the apparatus of example 19, further including means for determining a toggle rate for each item of training data in the training data set, means for sorting the items in the training data by their corresponding toggle rate, means for allocating a first number of items of the sorted items to a first group, and means for allocating a second number of items of the sorted items to a second group, the second number of items being sequentially located after the first number of items in the sorted training data.

Example 21 includes the apparatus of example 20, further including means for shuffling the items allocated to the first group within the first group.

Example 22 includes the apparatus of any one of examples 19-21, wherein the toggle rate associated with a training data item represents an amount of data variance within the training item.

Example 23 includes an apparatus for distributed training of neural networks, the apparatus comprising a neural network trainer to select a plurality of training data items, a power state controller to control an amount of power consumption of a central processing unit of the apparatus based on an average toggle rate of the training data items in the selected plurality of training data items, a neural network parameter memory to store neural network training parameters, and a neural network processor to implement a neural network to generate training data results using the selected plurality of training data items and the neural network training parameters, the neural network trainer to synchronize the training results with other nodes involved in distributed training and update the neural network training parameters stored in the neural network parameter memory based on the synchronized training results.

Example 24 includes the apparatus of example 23, wherein the power state controller is to control the amount of power consumption of the central processing unit by setting a power state of the central processing unit.

Example 25 includes the apparatus of any one of examples 23-24, wherein the toggle rate represents an amount of data variance within a training data item.

Example 26 includes the apparatus of example 23, wherein the neural network is implemented as a deep neural network.

Example 27 includes the apparatus of example 26, wherein the deep neural network includes at least one convolutional layer.

Example 28 includes the apparatus of example 23, wherein the training data items include image data.

Example 29 includes a non-transitory computer readable medium comprising instructions which, when executed, cause a machine to at least select a plurality of training data items of training items, determine an average toggle rate of the training items in the plurality of training data items, select a power state based on the average toggle rate, apply the selected power state to a central processing unit of the machine, perform neural network training using the selected plurality of training data items and stored training parameters to determine training results, synchronize the training results with other machines involved in distributed training, and update stored training parameters based on the synchronized training results.

Example 30 includes the non-transitory computer readable medium of example 29, wherein the toggle rate represents an amount of data variance within a training item.

Example 31 includes the non-transitory computer readable medium of example 29, wherein the training items include image data.

Example 32 includes a method for distributed training of neural networks, the method comprising selecting, by executing an instruction with a processor of a node, a plurality of training data items of training items, determining, by executing an instruction with the processor of the node, an average toggle rate of the items in the plurality of training data items, selecting, by executing an instruction with the processor of the node, a power state based on the average toggle rate, applying, by executing an instruction with the processor of the node, the selected power state to the node, performing, by executing an instruction with the processor of the node, neural network training using the selected plurality of training data items and stored training parameters to determine training results, synchronizing the training results with other nodes involved in the distributed training, and updating stored training parameters based on the synchronized training results.

Example 33 includes the method of example 32, wherein the toggle rate represents an amount of data variance within a training item.

Example 34 includes an apparatus for distributed training of neural networks, the apparatus comprising means for selecting, at a node, a plurality of training data items of training items, means for determining an average toggle rate of the items in the plurality of training data items, means for selecting a power state based on the average toggle rate, means for applying the selected power state to the node, means for performing neural network training using the selected plurality of training data items and stored training parameters to determine training results, means for synchronizing the training results with other nodes involved in the distributed training, and means for updating stored training parameters based on the synchronized training results.

Example 35 includes the apparatus of example 34, wherein the toggle rate represents an amount of data variance within a training item.

Although certain example methods, apparatus and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A first node in a plurality of nodes, the first node comprising:
    memory;
    machine readable instructions; and
    at least one processor circuitry to execute the instructions to:
        construct a first batch of training data items, the first batch to include at least one item from a first group of data items of a training data set and at least one data item from a second group of data items in the training data set, the first group of data items and the second group of data items sorted by toggle rate, the first batch of training data items having a first average toggle rate that is balanced with a second average toggle rate of a second batch; and
        train a neural network based on the first batch.

2. The first node of claim 1, wherein:
    a second node trains a neural network based on the second batch; and
    the second batch includes at least one data item from the first group of data items of the training data set and at least one data item from the second group of data items of the training data set.

3. The first node of claim 1, wherein the at least one processor circuitry is to:
    determine the toggle rates for the training data items in the training data set;
    sort the items in the training data by their corresponding toggle rate;
    allocate a first number of items of the sorted items to the first group; and
    allocate a second number of items of the sorted items to the second group, the second number of items having toggle rates which are sequentially after toggle rates of the first number of items in the sorted training data.

4. The first node of claim 3, wherein the at least one processor circuitry is to shuffle the items allocated to the first group within the first group.

5. The first node of claim 3, wherein the toggle rates of the first group of data items correspond to a first range of toggle rates, and the toggle rates of the second group of items correspond to a second range of toggle rates, the first range having different starting and ending values than the second range.

6. The first node of claim 5, wherein the toggle rates in the first range of toggle rates are less than a threshold toggle rate and the toggle rates in the second range of toggle rates are greater than the threshold toggle rate.

7. The first node of claim 1, wherein a toggle rate of corresponding items in the training data items represents an amount of data variance in the training data items.

8. A plurality of nodes comprising:
    a first compute node including first instructions and first programmable circuitry to utilize the first instructions to:
        construct a first batch of training data items, the first batch to include at least one data item from a first group of data items of a training data set and at least one data item from a second group of data items of the training data set, the first group of data items and the second group of data items sorted by toggle rate, the first batch of training data items having a first average toggle rate; and
        train a first copy of a neural network based on the first batch;
    a second compute node including second programmable circuitry to:
        construct a second batch of training data items, the second batch to include at least one data item from the first group of data items of the training data set and at least one data item from the second group of data items of the training data set, the second batch having a second average toggle rate that is balanced with the first average toggle rate; and train a second copy of the neural network based on the second batch; and a third compute node including second instructions and third programmable circuitry to utilize the second instructions to combine a first result from the first compute node and a second result from the second compute node to update the neural network.

9. The plurality of nodes of claim 8, wherein the first compute node is to obtain the first copy of the neural network from the third compute node, and the second compute node is to obtain the second copy of the neural network from the third compute node.

10. The plurality of nodes of claim 8, wherein the first compute node is to provide a first result of the training of the first copy of the neural network to the third compute node, and the second compute node is to provide a second result of the training of the second copy of the neural network to the third compute node.

11. The plurality of nodes of claim 10, wherein the first result represents a gradient of the trained first copy of the neural network.

12. The plurality of nodes of claim 8, wherein the first compute node is to apply power throttling based on an average toggle rate of items in the first batch.

13. The plurality of nodes of claim 8, wherein the third compute node is implemented by the first compute node.

14. The plurality of nodes of claim 8, wherein toggle rates of corresponding items in the training data items correspond to variation in the training data items that results in variations in power consumption.

15. The plurality of nodes of claim 14, wherein transistor switching activity increases with an increased toggle rate.

16. The plurality of nodes of claim 8, wherein a toggle rate represents an amount of data variance in the training data items.

17. A non-transitory computer readable medium comprising instructions which, when executed, cause a first node in a plurality of nodes to at least:

construct a first batch of training items, the first batch to include at least one item from a first group of data items of a training data set and at least one data item from a second group of data items in the training data set, the first group of data items and the second group of items sorted by toggle rate, the first batch of training data items having a first average toggle rate that is balanced with a second average toggle rate of a second batch; and train a neural network based on the first batch.

18. The non-transitory computer readable medium of claim 17, wherein the instructions, when executed, cause the first node to at least:

determine the toggle rates for the training data items in the training data set;

sort the items in the training data by their corresponding toggle rate;

allocate a first number of items of the sorted items to the first group; and allocate a second number of items of the sorted items to the second group, the second number of items being located after the first number of items in the sorted training data.

19. The non-transitory computer readable medium of claim 17, wherein the instructions, when executed, cause the first node to at least:

determine an average toggle rate of the items in the first batch;

select a power state based on the average toggle rate; and apply the selected power state to the first node.

20. The non-transitory computer readable medium of claim 17, wherein a toggle rate is associated with variation in the training data items that results in variations in power consumption.

21. The non-transitory computer readable medium of claim 20, wherein transistor switching activity is associated with toggle rate, and the transistor switching activity contributes to higher power consumption.

* * * * *